United States Patent
Tsukada

(10) Patent No.: US 7,327,372 B2
(45) Date of Patent: Feb. 5, 2008

(54) COLOR CORRECTING PARAMETER CALCULATOR, IMAGE COLOR CORRECTING DEVICE, METHOD OF CALCULATING COLOR CORRECTING PARAMETERS, AND PROGRAM THEREFOR

(75) Inventor: Masato Tsukada, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 10/163,645

(22) Filed: Jun. 6, 2002

(65) Prior Publication Data

US 2003/0030754 A1 Feb. 13, 2003

(30) Foreign Application Priority Data

Jun. 6, 2001 (JP) ............................. 2001-170376

(51) Int. Cl.
| | |
|---|---|
| H04N 1/60 | (2006.01) |
| H04N 9/64 | (2006.01) |
| G03F 3/08 | (2006.01) |
| G09G 5/02 | (2006.01) |
| G06K 9/00 | (2006.01) |
| G06T 11/60 | (2006.01) |
| G06K 15/02 | (2006.01) |
| H04N 5/225 | (2006.01) |
| H04N 9/73 | (2006.01) |

(52) U.S. Cl. ................. 345/589; 345/591; 345/593; 345/606; 345/643; 348/557; 348/807; 358/518; 358/520; 358/525; 382/162; 382/167

(58) Field of Classification Search ........ 345/589–594, 345/599, 549, 690, 597, 606, 643; 348/502, 348/529, 520, 539, 557, 560, 577, 582, 599, 348/612, 723, 760, 807, 223–225, 655–658, 348/527; 382/162–167; 358/515–520, 525, 358/535

See application file for complete search history.

(56) References Cited

U.S. PATENT DOCUMENTS 5,696,839 A * 12/1997 Siegeritz .................... 382/162

(Continued)

FOREIGN PATENT DOCUMENTS

JP 6-121159 4/1994

(Continued)

OTHER PUBLICATIONS

"Automatic Color Correction Method for Preferred Color Reproduction", M. Tsukada, et al., Japan (2000), pp. 8-12.

(Continued)

*Primary Examiner*—Wesner Sajous
(74) *Attorney, Agent, or Firm*—Scully, Scott, Murphy & Presser PC

(57) ABSTRACT

In a color correcting parameter calculator, a color correcting unit 11 calculates a target color by executing color correction processing of an input color on a reference side while a reference side color perception value calculator unit 13 calculates color perception values of the input color and its target color on the reference side. An object side color perception value calculator unit 15 calculates color perception values of an input color on an object side. A color difference searching unit 16 detects that input color on the reference side which has a minimum color difference with the input color on the object side, by accessing a color perception storage unit 14 for input and target colors for the reference side. A device dependent color unit 17 on the object side calculates device dependent color data of a target color on the object side with reference to perception values of the target color on the reference side while a color correcting parameter calculator 18 calculates color correcting parameters.

23 Claims, 9 Drawing Sheets

U.S. PATENT DOCUMENTS

| | | | |
|---|---|---|---|
| 5,874,988 A * | 2/1999 | Gu | 348/97 |
| 6,118,896 A * | 9/2000 | Ohnuma | 382/167 |
| 6,125,199 A * | 9/2000 | Sato et al. | 382/162 |
| 6,229,580 B1 * | 5/2001 | Inoue | 348/649 |
| 6,462,835 B1 * | 10/2002 | Loushin et al. | 358/1.9 |
| 6,480,625 B1 * | 11/2002 | Yamazaki | 382/167 |
| 6,594,384 B1 * | 7/2003 | Kim et al. | 382/162 |
| 2002/0005965 A1 * | 1/2002 | Nagae et al. | 358/518 |
| 2002/0118381 A1 * | 8/2002 | Shirai et al. | 358/1.9 |

FOREIGN PATENT DOCUMENTS

| | | |
|---|---|---|
| JP | 6-133329 | 5/1994 |
| JP | H9-9089 | 1/1997 |
| JP | 10-198795 | 7/1998 |
| JP | H10-191075 | 7/1998 |
| JP | 11-17969 | 1/1999 |
| JP | H11-155076 | 6/1999 |
| JP | 2000-113174 | 4/2000 |
| JP | 2001-92956 | 4/2001 |

OTHER PUBLICATIONS

"Color Imaging: Device-Independent Color, Color Hardcopy, and Graphic Arts VI", SPIE (Jan. 2001), vol. 4300, pp. 215-223.

* cited by examiner

| INDEX NUMBER | INPUT COLOR RGB VALUES | | | TARGET COLOR RGB VALUES | | |
|---|---|---|---|---|---|---|
| 1 | $R_1$ | $G_1$ | $B_1$ | $tR_1$ | $tG_1$ | $tB_1$ |
| 2 | $R_2$ | $G_2$ | $B_2$ | $tR_2$ | $tG_2$ | $tB_2$ |
| ⋮ | ⋮ | ⋮ | ⋮ | ⋮ | ⋮ | ⋮ |
| N | $R_N$ | $G_N$ | $B_N$ | $tR_N$ | $tG_N$ | $tB_N$ |

FIG.4

| INDEX NUMBER | INPUT COLOR PERCEPTION VALUES | | | TARGET COLOR PERCEPTION VALUES | | |
|---|---|---|---|---|---|---|
| 1 | $L_1$ | $a_1$ | $b_1$ | $tL_1$ | $ta_1$ | $tb_1$ |
| 2 | $L_2$ | $a_2$ | $b_2$ | $tL_2$ | $ta_2$ | $tb_2$ |
| ⋮ | ⋮ | ⋮ | ⋮ | ⋮ | ⋮ | ⋮ |
| N | $L_N$ | $a_N$ | $b_N$ | $tL_N$ | $ta_N$ | $tb_N$ |

FIG.5

COLOR CORRECTING PARAMETER CALCULATOR, IMAGE COLOR CORRECTING DEVICE, METHOD OF CALCULATING COLOR CORRECTING PARAMETERS, AND PROGRAM THEREFOR

BACKGROUND OF THE INVENTION

This invention relates to a color correcting parameter calculator, an image color correcting device, a method of calculating color correcting parameters in the color correcting parameter calculator, and a program for use in executing the method.

With development of color image devices, it is a recent trend that a high image quality technique of a color image has been important more and more. Especially, strict requirements have been imposed on colors and the image quality has greatly depended on the colors reproduced by color image devices. For example, it has been said that facial skin color, green foliage, and blue sky in a natural image are very significant for a human being. This shows that the image quality can be improved by desirably reproducing such colors.

A correction method is proposed in Japanese Patent Unexamined Publication No. Hei 10-198795 (namely, 198795/1988) so as to reproduce specific objects of facial skin color, green, blue into desirable colors for a human being. The above-mentioned Japanese Patent Unexamined Publication No. Hei 10-198795 corresponds to U.S. Pat. No. 6,229,580 and will be referred to as first reference. In the correction method that may be referred to as a selective color correction method, a color correcting calculation algorithm is used to calculate a selective color correction factor or degree. With this method, it is possible to carry out color correction processing only about a specific hue without changing any other colors except the color in question to be corrected.

A RGB correction formula used in correcting each of specific hues as mentioned above is given by:

$$(R', G', B') = (R, G, B) + hx \cdot (r, g, b), \quad (1)$$

where (R, G, B) represent input RGB values included in an input image; (R', G', B'), RGB values after correction; and (r, g, b), RGB correction values. In addition, hx is representative of a distance between a center color (Rc, Gc, Bc) to be corrected and an input color (R, G, B) and serves as a parameter (or a color approximation degree) for controlling strength of correction and is given by:

$$hx = [(pos(m - |\text{Hue} - h/|))/m] \times s \times v \quad (2)$$

where pos (x) takes 0, if x<0, and takes x, if x ≧0; m represents an acceptable hue range; Hue represents Hue values of HSV calculated from the center color to be corrected; h, s, v represent HSV values corresponding to input RGB values.

In order to realize a preferred color reproduction, the RGB correction values (r, g, b) in the formula (1) and the acceptable hue range (m) in the formula (2) should be set to optimum values and range, respectively, in consideration of a hue of a typical color to be corrected. The RGB correction values (r, g, b) and the acceptable hue range (m) may be called color correction parameters. Among these color correction parameters, the RGB values (r, g, b) are more important which serve to change a color to be corrected into a desired color. Such RGB values (r, g, b) are adjusted and determined by an operator, who is watching an input image, in the method disclosed in Japanese Patent Unexamined Publication No. Hei 10-198795.

Besides the above-reference, various methods have been also offered so as to correct a color in an object zone in an image, for example, in Japanese Unexamined Patent Publication No. Hei 11-17969 (17969/1999), Hei 6-133329 (133329/1994), and Hei 6-121159 (121159/1994). In the above-mentioned methods, an operator adjusts the color correction parameters so that a correction object comes to a preferred color, actually watching and confirming an image on a color display device. In other words, color correction is manually executed.

Now, let a huge amount of color images be present. In this case, a very long time and enormous labor are required to process these color images. Moreover, such manual operation results in a variation of an image quality in dependency upon operator's skills. Automatic processing that dispenses with any manual operation would be needed so as to solve the above-mentioned problem.

On the other hand, proposal has been offered about a method of automatically correcting a color of an object zone into a preferred color. For example, such a method is disclosed in a paper (pages 9 to 12) contributed by the instant inventor and etc., to Color Forum Japan 2000 (Nov. 15, 2000) and entitled "Automatic color correction method for Preferred Color Reproduction".

Specifically, the method disclosed in the above-mentioned paper is featured by the steps of automatically extracting a typical or representative color from a correction object zone and assigning optimum color correction parameters in consideration of hue, brightness, and chroma (or saturation) of the extracted typical color.

Herein, optimum color correction parameters of a typical color, as mentioned above, can be calculated by a method disclosed in Japanese Patent Unexamined Publication No. Hei 11-267937 (267937/1999) that would be referred to as second reference. Herein, it is assumed that the method disclosed in the second reference is applied to the first reference. In this event, provision is made about a great number of image sets for learning and selection is done about a typical color in each correction object zone of the images. Under the circumstances, subjective evaluation is performed so as to obtain two color correction parameters, such as the RGB correction values (r, g, b) and the acceptable hue range m, and to attain combinations of the typical colors and the color correction parameters.

A hue distribution range in which each typical color falls is determined from each hue of the typical colors and is divided into hue divided region at a certain distance. The color correction parameters to be assigned to each hue divided region are obtained by calculating each typical color in the hue divided region with reference to their hues, by getting color correction parameters corresponding to each typical hue, and by statistically processing them.

In FIG. 1, a hue distribution range in which a correction object might fall is divided into a plurality of hue divided regions to which color correction parameters are assigned.

The method disclosed in the first reference is advantageous in that significant object colors for a human being, such as facial skin color, green foliage, blue of sky, can be adjusted by an operator to obtain adjusted effects of color correction and the adjusted effects can be visibly and automatically reflected on a corrected image.

The color correction parameters in the above-mentioned methods are obtained by preparing a calibrated reference color image device, by carrying out subjective evaluation experiments, and by statistically processing results of the subjective evaluation experiments. This shows that the color correction parameters largely depend on color characteristics of the reference color image device. From this fact, it is readily understood that desirable color correction effects can not be always accomplished when the above-mentioned method is applied to any other color image devices that have color characteristics of white and the like different from those of the reference color image device.

The above-mentioned method of automatically correcting colors in the specific object zone is effective to correct colors in the specific object zone of a natural image displayed on the reference color image device. However, no consideration is made at all about calculating color correction parameters suitable for any other color image devices that have different color characteristics from the reference color image device.

Similar problems take place also in the above-referenced publications, such as Japanese Patent Unexamined Publication Nos. Hei 10-198795, Hei 11-17969, Hei 6-133329, and Hei 6-121159.

Practically, color correction should be carried out when a variation of color characteristics is caused to occur in the other color image devices except the reference color image device. In this event, it is necessary to calculate new or updated color correction parameters in connection with the other color image devices also so as to accomplish color correction effects similar to those on the reference color image device.

Heretofore, subjective evaluation experiments have been performed to calculate color correction parameters each time when the color characteristics are changed in each color image device. Such subjective evaluation experiments are laborious and time-consuming.

In any event, no proposal has been made about a method of calculating color correction parameters in connection with different color image devices from the reference color image device. Moreover, no consideration has been made at all about effectively utilizing the color correction parameters adjusted to the reference color image device.

SUMMARY OF THE INVENTION

It is an object of this invention to provide a method of effectively calculating color correction parameters of an object color image device different in color characteristics from a reference color image device.

It is another object of this invention to provide a method of the type described, which is capable of accomplishing, on the object color image device, color characteristics similar to those of the reference color image device.

It is still another object of this invention to provide a method of the type described, which is capable of calculating the color correction parameters of the object color image device without performing any subjective evaluation experiments.

It is yet another object of this invention to provide a color correction parameter calculator which is capable of performing the above-mentioned method.

It is another object of this invention to provide a program which is for use in the above-mentioned method and calculator.

A color correcting parameter calculator to which this invention is applicable is for use in calculating object color correcting parameters of an object color image device that is different from a reference color image device. According to a first aspect of this invention, the color correcting parameter calculator comprises means for calculating a reference target color after color correction in response to input colors and their color reference correcting parameters related to the reference color image device, means for calculating reference target color perception values and reference color perception values in connection with the reference target colors and the input colors, respectively, together with object color perception values in connection with the input colors given also to the object color image device, means for searching for a specific color which has a minimum color difference with each input color, in response to the reference target color perception values, the reference color perception values, and the object color perception values, means for calculating an object target color in connection with the object color image device on the basis of the reference target color perception values corresponding to the specific color, and means for calculating the object color correcting parameters of the object color image device on the basis of the object target color and each of the object input colors.

According to a second aspect of this invention, the color correcting parameter calculator comprises color correcting means for calculating reference target colors after color correction in response to input colors and their reference color correcting parameters calculated in connection with the reference color image device, a reference side storage unit for storing the input colors and the reference target colors calculated by the color correcting means, color perception value calculating means for calculating reference color perception values concerned with the input colors and the reference target colors stored in the reference side storage unit, together with object color perception values concerned with the input colors given to the object color image device, a color perception value storage unit for storing the reference color perception values of the input colors and the reference color perception values concerned with the reference color image device, color difference searching means for searching for a specific color that has a minimum color difference with the input colors given to the object color image device and that is selected from the input colors given to the reference color image device, object device dependent color calculating means for rendering the reference color perception values of the reference target colors into object color perception values of object target colors corresponding to the input colors given to the object color image device, to get a provisional object target color from the object color perception values, to convert the provisional object target color into a device dependent color related to the object color image device, and to thereby obtain the object target colors from the provisional object target color, and color correcting parameter calculating means for calculating the object color correcting parameters of the object color image device on the basis of the input colors and the object target colors related to the object color image device.

According to a third aspect of this invention, the color correcting parameter calculator comprises color correcting means for calculating reference target colors after color correction in response to input colors and their reference color correcting parameters calculated in connection with the reference color image device, reference side color perception value calculating means for calculating color perception values of the reference target colors and the input colors given to the reference color image device, corresponding color calculating means for calculating that reference corresponding colors on the reference color image device which correspond to the input colors given to the object color image device, color perception value calculating means for calculating color perception values of the reference corresponding colors, color difference searching means for searching for a specific color that has a minimum color difference with the reference corresponding colors, from the input colors given to the reference color image device, object side device color calculating means for rendering a specific one of the reference target colors of the reference color image device that corresponds to the specific color, into a target corresponding color of the specific color, to convert the target corresponding color into a device dependent color on the object color image device and to thereby obtain an object target color of the object color image device, and color correcting means for calculating the color correcting parameters of the object color image device with reference to the object target color and the input colors given to the object color image device.

According to a fourth aspect of this invention, the color correcting parameter calculator comprises color correcting means for calculating reference target colors after color correction in response to input colors and their reference color correcting parameters calculated in connection with the reference color image device, object corresponding color calculating means for calculating object corresponding colors of the object color image device on the basis of the input colors of the reference color image device and the reference target colors, reference side color perception values calculating means for calculating color perception values of the object corresponding colors calculated by the object corresponding color calculating means, object color perception value calculating means for calculating color perception values of the input colors of the object color image device, color difference searching means for searching for a specific color that has a minimum color difference with the input colors of the object color image device, from the object corresponding colors calculated by the object corresponding color calculating means, object side device color calculating means for rendering an object corresponding color of the object color image device that corresponds to a specific one of the reference target colors made to correspond to the specific color calculated by the color difference searching means, into an object target color corresponding to the input colors of the object color image device, to calculate a device dependent color of the object color image device from the object target color and to obtain object target colors on the object color image device, and color correcting parameter calculating means for calculating the color correcting parameters of the object color image device on the basis of the input colors of the object color image device and the object target colors of the object color image device.

An image color correcting device to which this invention is applicable includes a color correcting parameter calculator which calculates object color correcting parameters of an object color image device on the basis of reference color correcting parameters of a reference color image device different from the object color image device. According to a fifth aspect of this invention, the color correcting parameter calculator is structured by either one of the first through the fourth aspects mentioned above.

A method to which this invention is applicable is for use in calculating object color correcting parameters of an object color image device on the basis of reference color correcting parameters of a reference color image device. According to a sixth aspect of this invention comprises the steps of calculating a reference target color after color correction in response to input colors and their color reference correcting parameters related to the reference color image device calculating reference target color perception values and reference color perception values in connection with the reference target colors and the input colors of the reference color image device, calculating object color perception values in connection with the input colors given also to the object color image device, searching for a specific color which has a minimum color difference with each input color of the object color image device, in response to the reference target color perception values, from the input colors of the reference color image device, setting a specific one of the reference target color perception values that corresponds to the specific color as a specific one of the object color perception values that corresponds to the input colors of the object color image device, calculating object target colors of the object color image device from the specific one of the object color perception values by converting the specific object color perception value into a device dependent color of the object color image device, and calculating the object color correcting parameters of the object color image device on the basis of the object target colors and each of the object input colors.

The method according to a seventh aspect of this invention comprises the steps of calculating reference target colors after color correction from input colors and their color correcting parameters of the reference color image device, calculating reference color perception values and reference target color perception values related to the input colors and the reference target colors of the reference color image device, calculating a reference corresponding color of the reference color image device that corresponds to the input colors of the object color image device, calculating a corresponding color perception value of the reference corresponding color, searching for a specific color that has a minimum color difference with the reference corresponding color, from the input colors of the reference color image device, setting a specific one of the reference target colors that corresponds to the specific color, as a corresponding target color corresponding to the reference corresponding color, calculating object target colors of the object color image device by converting the corresponding target color into a device dependent color, and calculating the object color correcting parameters from the object target colors and the input colors of the object color image device.

The method according to an eighth aspect of this invention comprising the steps of calculating reference target colors after color correction from input colors and their color correcting parameters of the reference color image device, calculating object corresponding colors of the object color image device from the input colors of the reference color image device and the reference target colors, calculating object color perception values of the object corresponding colors of the object color image device, calculating object input color perception values from the input colors of the object color image device, searching for a specific color that has a minimum color difference with the input colors of the object color image device, from the object corresponding colors, setting a specific one of the object corresponding colors that corresponds to a specific one of the reference target colors corresponding to the specific color, as a corresponding object target color corresponding to the input colors of the object color image device, calculating object target colors of the object color image device by calculating a device dependent color from the specific one of the object corresponding colors, and calculating the object color correcting parameters of the reference color image device on the basis of the object target colors and the input colors of the object color image device.

A program to which this invention is applicable is for use in executing, by a computer, a method of calculating object color correcting parameters of an object color image device on the basis of reference color correcting parameters of a reference color image device. The program according to a ninth aspect of this invention makes the computer execute the processes of calculating reference target colors after color correction from input colors and their color correcting parameters of the reference color image device, calculating reference color perception values and reference target color perception values related to the input colors and the reference target colors of the reference color image device, calculating a reference corresponding color of the reference color image device that corresponds to the input colors of the object color image device, calculating a corresponding color perception value of the reference corresponding color, searching for a specific color that has a minimum color difference with the reference corresponding color, from the input colors of the reference color image device, setting a specific one of the reference target colors that corresponds to the specific color, as a corresponding target color corresponding to the reference corresponding color, calculating object target colors of the object color image device by converting the corresponding target color into a device dependent color, and calculating the object color correcting parameters from the object target colors and the input colors of the object color image device.

The program according to a tenth aspect of this invention makes the computer execute the processes of calculating reference target colors after color correction from input colors and their color correcting parameters of the reference color image device, calculating reference color perception values and reference target color perception values related to the input colors and the reference target colors of the reference color image device, calculating a reference corresponding color of the reference color image device that corresponds to the input colors of the object color image device, calculating a corresponding color perception value of the reference corresponding color, searching for a specific color that has a minimum color difference with the reference corresponding color, from the input colors of the reference color image device, setting a specific one of the reference target colors that corresponds to the specific color, as a corresponding target color corresponding to the reference corresponding color, calculating object target colors of the object color image device by converting the corresponding target color into a device dependent color, and calculating the object color correcting parameters from the object target colors and the input colors of the object color image device.

The program according to an eleventh aspect of this invention makes the computer execute the processes of calculating reference target colors after color correction from input colors and their color correcting parameters of the reference color image device, calculating object corresponding colors of the object color image device from the input colors of the reference color image device and the reference target colors, calculating object color perception values of the object corresponding colors of the object color image device, calculating object input color perception values from the input colors of the object color image device, searching for a specific color that has a minimum color difference with the input colors of the object color image device, from the object corresponding colors, setting a specific one of the object corresponding colors that corresponds to a specific one of the reference target colors corresponding to the specific color, as a corresponding object target color corresponding to the input colors of the object color image device, calculating object target colors of the object color image device by calculating a device dependent color from the specific one of the object corresponding colors, and calculating the object color correcting parameters of the reference color image device on the basis of the object target colors and the input colors of the object color image device.

According to a fifteenth aspect of this invention, the program makes the computer execute the processes of calculating reference target colors after color correction from input colors and their color correcting parameters of the reference color image device, calculating object target colors on the basis of the input colors and the reference target colors, selecting an optimum one of the object target colors from the reference and the object target colors, and calculating the object color correcting parameters from the optimum one of the object target colors.

BRIEF DESCRIPTION OF THE DRAWING

FIG. 4 shows a view for describing a first storage unit illustrated in FIG. 2 so as to store input and target colors;

FIG. 5 shows a view for describing a second storage unit to store color perception values of the input and the target values;

DESCRIPTION OF THE PREFERRED EMBODIMENTS

Figure 1:
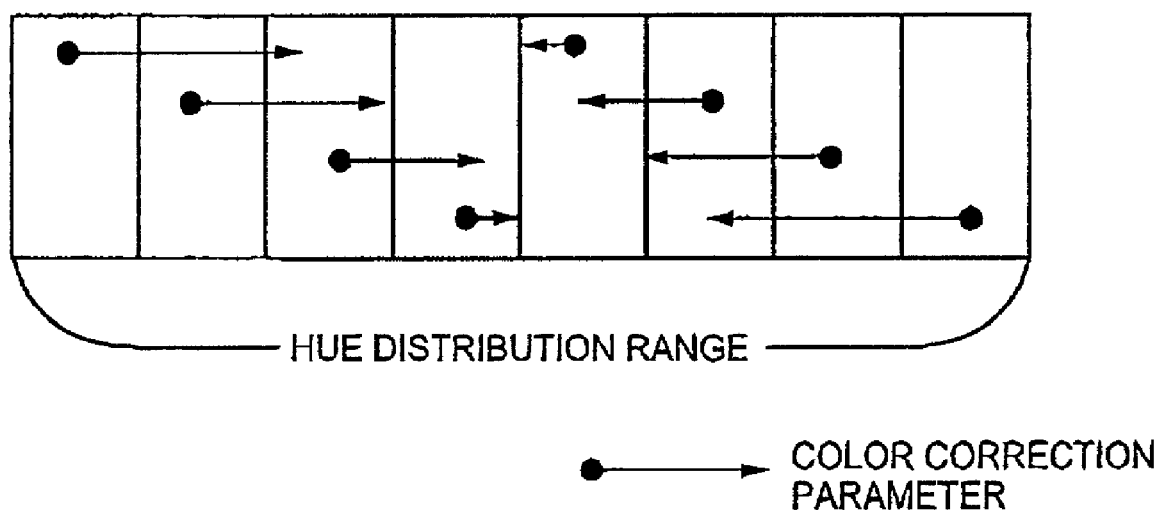
FIG. 1 shows a diagrammatic view for use in describing a conventional method of setting color correcting parameters.
Figure 2:
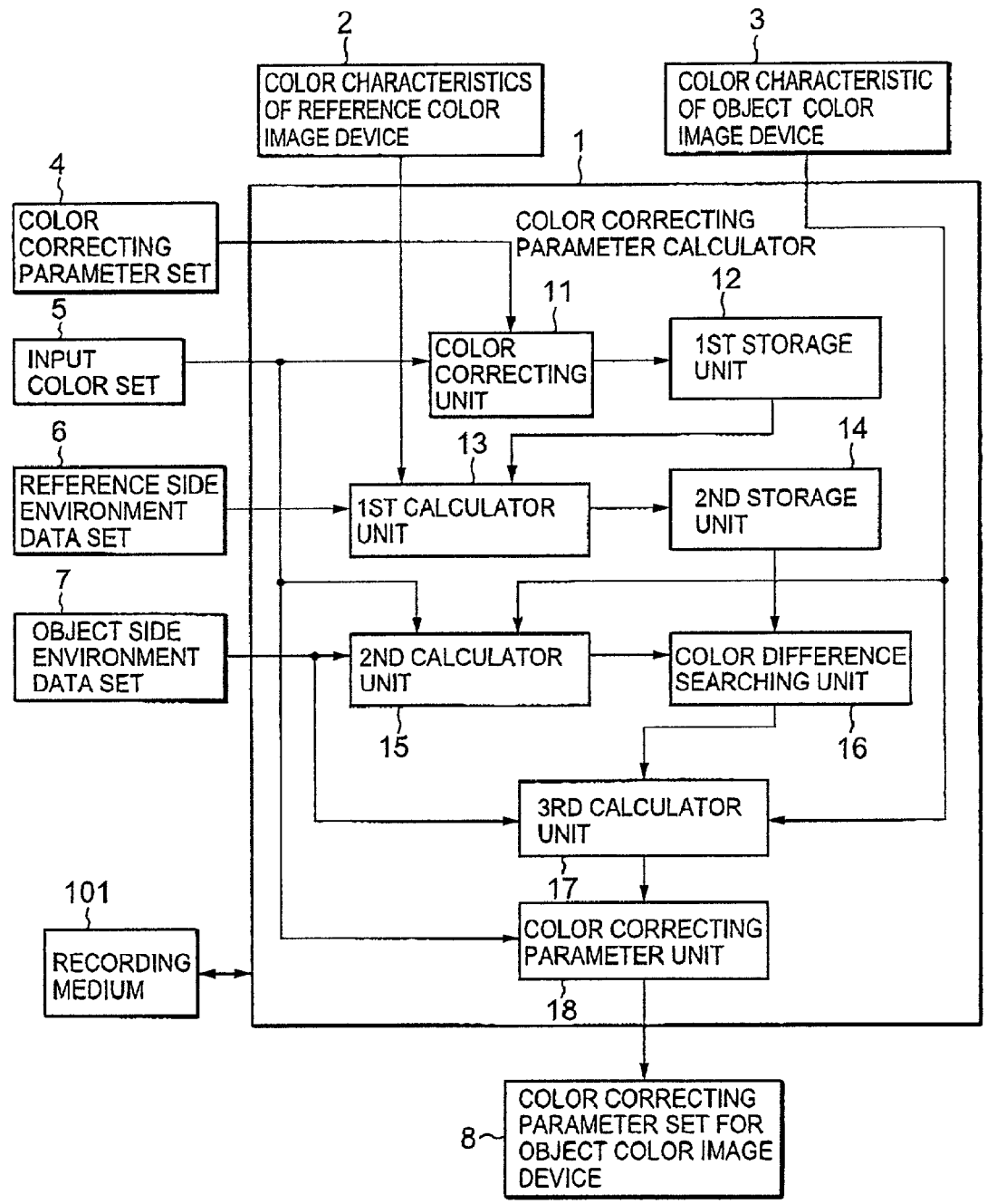
FIG. 2 shows a block diagram of a color correcting parameter calculator according to an embodiment of this invention.

Referring to FIG. 2, description will be made about a color correcting parameter calculator 1 according to a first embodiment of this invention that will be simply called a parameter calculator hereinafter. The illustrated parameter calculator 1 is operable in response to color characteristics 2 of a standard or reference color image device (not shown), color characteristics 3 of an object image device, a set 4 of color correcting parameters (will be called a color correcting parameter set 4), a set 5 of input colors (an input color set 5), a set 6 of observation environment data on a reference side, and a set 7 of observation environment data on an object side. The sets 6 and 7 of the observation environment data will be referred to as reference side and object side environment data, respectively.

Practically, the parameter calculator 1 may be mainly implemented by a computer, a microprocessor, or the like that is operable in accordance with a program stored in a recording medium 101 or may be structured by a hardware circuit. Herein, it is assumed that the illustrated parameter calculator 1 is operated in accordance with the program stored in the recording medium 101.

For convenience of description, although the illustrated parameter calculator 1 will be described by dividing the same into a plurality of units, each unit may be recognized as a program stage executed by the program except storage units.

Now, the parameter calculator 1 has a color correcting unit 11, a first storage unit 12, a first calculator unit 13, a second storage unit 14, and a second calculator unit 15. In this event, the first storage unit 13 stores both input colors and target colors (will be mentioned later in detail). The target colors may be referred to as reference target colors. The first calculator unit 13 calculates first color perception values which are calculated in connection with the reference side and which may be therefore called reference color perception values. The second storage unit 14 stores the first and reference color perception values of the input and the reference target colors that are calculated by the first calculator unit 13 while the second calculator unit 15 calculates color perception values which are calculated about the object side and which may be called object color perception values.

Furthermore, the illustrated parameter calculator 1 has a color difference searching unit 16 for searching for a minimum color difference, a third calculator unit 17, and a color correcting calculation unit 18. The third calculator unit 17 serves to calculate device dependent colors that depend on the object color device. As mentioned before, all of the above-mentioned units are operated in accordance with the program stored in the recording medium 101 to produce a set 8 of color correcting parameters for the object color image device.

The color correcting unit 11 is given the input color set 5 composed of a plurality of pre-correction (or correction-free) color data and the color correcting parameter set 4 composed of color correcting parameters corresponding to the input colors. The color correcting unit 11 executes color correction processing in connection with all of the input colors to obtain the reference target colors and to successively store the input colors and the corresponding reference target colors into the first storage unit 12.

The first calculation unit 13 is operable in response to the color characteristics 2 of the reference color image device (will be referred to as reference color characteristics), the observation environment data 6 on the reference side (will be called reference environment data), and the input and the reference target colors stored in the first storage unit 12. Responsive to the above-mentioned data, the first calculation unit 13 calculates reference color perception values about all of the input colors and the reference target colors and stores them into the second storage unit 14. The above color perception values may be called reference color perception values. Thus, the second storage unit 14 stores the reference color perception values related to both the input colors and the corresponding reference target colors.

On the other hand, the second calculator unit 15 is given the input color set 5, the color characteristics 3 of the object color image device, and the object side environment data set 7 and calculates color perception values in connection with the input colors on the object side. The color perception values calculated by the second calculator unit 15 may be referred to as object side color perception values or object color perception values.

The color difference searching unit 16 is coupled to the second storage unit 14 and the second calculator unit 15 to search for the second storage unit 14 in response to the object side color perception values. Specifically, the color difference searching unit 16 searches for a specific one of the input colors that has a minimum color difference with the input colors of the object color image device, from the input colors and the corresponding reference target colors stored in the second storage unit 14. The specific input color is related to the reference color image device in the illustrated example. Thus, the specific input color and the corresponding reference target color are calculated by the color difference searching unit 16 on the basis of the object color perception values of the object color image device and the reference side color perception values stored in the second storage unit 14.

Furthermore, the illustrated color difference searching unit 16 produces a specific perception value of the reference target color that has a minimum color difference with each of the object side color perception values. As a result, the specific perception value that corresponds to one of the input colors is sent together with a corresponding one of the reference target colors from the color difference searching unit 16 to the third calculator unit 17.

Responsive to the specific perception value, the object side environment data set 7, and the color characteristics 3 of the object color image device, the third calculator unit 17 calculates device dependent color of the object color image device from the specific perception value of the specific target color. The color correcting parameter unit 18 calculates the color correcting parameter set with reference to the input color set and the device dependent color of the above-mentioned target color.

Figure 3:
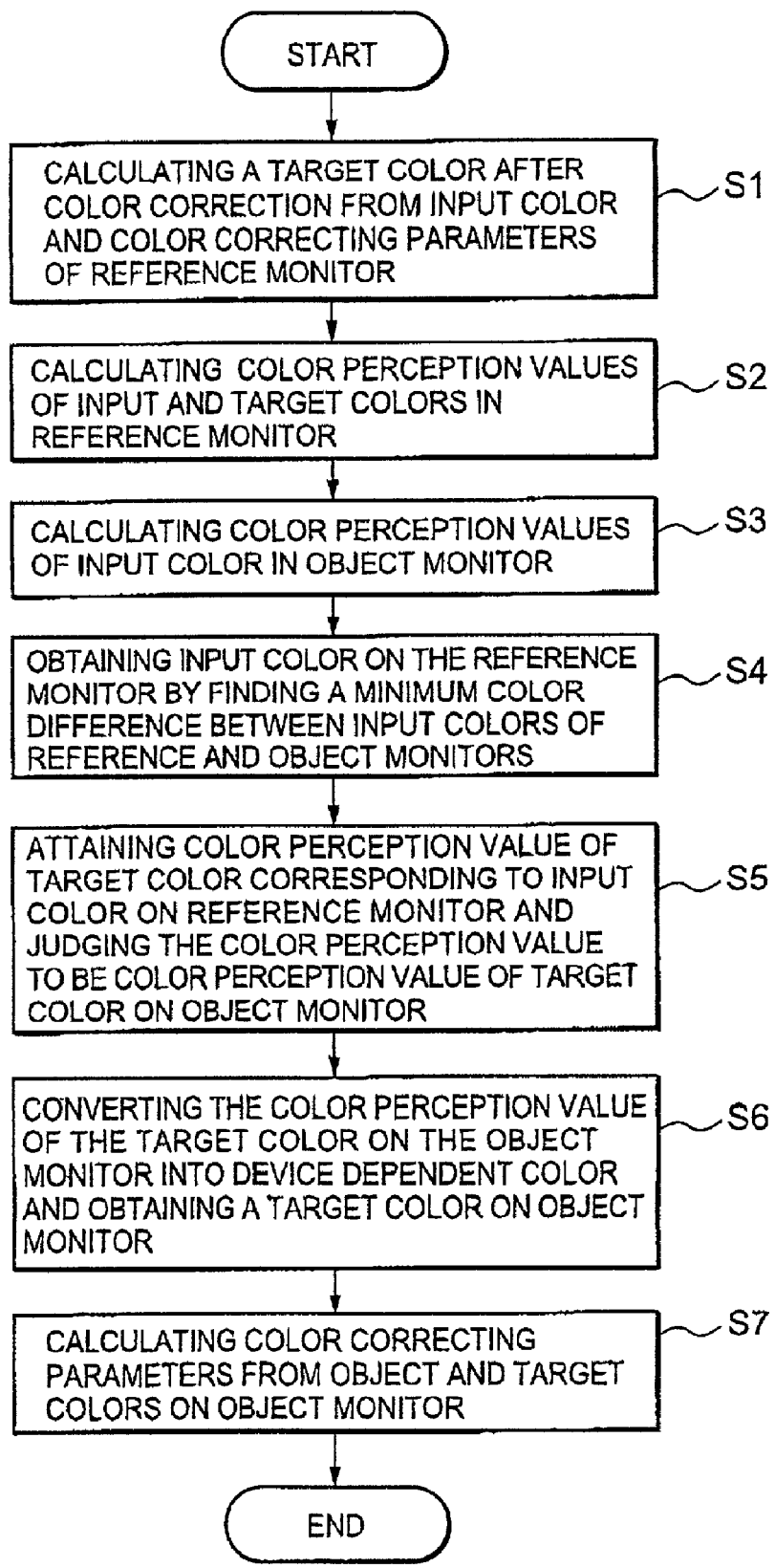
FIG. 3 shows a flow chart for use in describing operation of the color correcting parameter calculator illustrated in FIG. 2.

Referring to FIGS. 3 to 5 together with FIG. 2, the color correcting parameter calculator 1 illustrated in FIG. 2 is operated in accordance with a flow chart shown in FIG. 3. In addition, the first and the second storage units 12 and 14 are shown in FIGS. 4 and 5, respectively. In FIG. 4, the first storage unit 12 stores the input colors represented by RGB values and the corresponding target colors represented also by RGB values. Each input color can be designated by an index number. The RGB values of the input colors are specified by (Rn, Gn, Bn) where n is a positive integer while the RGB values of the target values are specified by (tRn, tGn, tBn) in FIG. 4.

In FIG. 5, the second storage unit 14 stores the input color perception values, which are represented by (Ln, an, bn) and the corresponding target color perception values which are represented by (tLn, tan, tbn).

Now, each step illustrated in FIG. 3 is executed in accordance with the program stored in the recording medium 101 (FIG. 2).

It is assumed that provision is made about a reference color image device (not shown) and an object color image device (not shown) that has different color characteristics from the reference color image device. In addition, it is also assumed that the illustrated color correcting parameter calculator 1 is operated to calculate color correcting parameters of the object color image device that are needed to realize the same color correction effect as the reference color image device. In order to facilitate understanding of this invention, it is surmised that the color correcting parameter calculator 1 executes color correction processing by using the color correction method and the color correcting parameters mentioned in Japanese Unexamined Patent Publication No. Hei 10-198795, namely, 198795/1998 and that the reference and the object color image devices will be called reference and object monitors, respectively.

Under the circumstances, the illustrated color correcting parameter calculator 1 is used to calculate a set of color correcting parameters of the object monitor. At first, it is presumed that color characteristics of the reference and the object monitors, reference and the object side environment data sets, the input color sets extracted from correction zones, and color correcting parameter sets corresponding to the input colors have been previously prepared as input data given to the color correcting parameter calculator 1. In this case, a color appearance model is assumed to be used in the color correcting calculator 1.

Taking the above into consideration, description is made about the operation illustrated in FIG. 3. In FIG. 3, the color correcting parameter calculator 1 calculates target colors after color correction by using the input colors and color correcting parameters of the reference monitor (step S1 in FIG. 3). The target colors may be referred to as reference target colors. Such calculation is carried out by the color correcting unit 11 illustrated in FIG. 2. Subsequently, color perception values, namely, reference color perception values of the reference monitor are calculated at a step S2 by the first calculator unit 13 by the use of the color appearance model.

The color correcting parameter calculator 1 calculates color perception values of input colors of the object monitor at a step S3 by the use of the second calculator unit 15. The calculated color perception values may be called object color perception values. A step S4 is carried out to find out the specific input color of the reference monitor that has a color perception value closest to that of the input color of the object monitor. The specific input color is selected from the input color set stored in the first storage unit 12 and has a minimum color difference with the input color of the object monitor.

Thereafter, the color correcting parameter calculator 1 judges a color perception value of the target color corresponding to the input color obtained at the step S4 to be the color perception value of a provisional target color corresponding to the input color on the object monitor at a step S5. Thus, the color perception value of the provisional target color on the object monitor is obtained at the step S5 and is converted into a device dependent color on the object monitor to attain an object target color on the object monitor (step S6). In addition, the color correcting parameter device 1 calculates the color correcting parameters in connection with the object monitor with reference to the input and the object target colors at a step S7.

Now, color correcting parameters of the object monitor to be calculated are specified by RGB correcting parameters (r, g, b) and an acceptable hue range (m) given by Equations (1) and (2) mentioned in connection with the prior art. Among the color correcting parameters, the RGB correcting parameters (r,g,b) are of significance because they seriously influence results of color correction while the acceptable hue angle is not so significant as compared with the former because the latter is roughly set within each of the correction zones in consideration of uniform correction all over each correction zone. In addition, it has been empirically confirmed that no adverse influence is exerted even when the same acceptable hue range (m) on the reference monitor is used on the object monitor. Taking the above into account, the acceptable hue range (m) determined in the reference monitor can be used as that of the object monitor.

Herein, it is noted that the input colors depicted by (Rc, Gc, Bc) extracted from the correcting zone of the input color set 5 are previously given by a subjective evaluation experiment or the like together with RGB correcting values that correspond to each input color related to the color correcting parameter set 4. Specifically, the input colors (Rc, Gc, Bc) are voluntarily extracted from a correcting zone of a natural image and are subjected to adjustment in relation to the acceptable hue range (m) into the RGB correcting values (r,g,b).

Description will be made about the color correcting unit 11 made to correspond to the color correcting processing carried out at the step S1. By the color correcting processing, the target colors (Rt, Gt, Bt) obtained after correction of the input colors (Rc, Gc, Bc) are given by:

$$(Rt, Gt, Bt) = (Rc, Gc, Bc) + [(pos(m - |Hue - h|))/m] \times s \times v - (r, g, b), \quad (3)$$

where Hue is representative of hue values H obtained by converting the input colors (Rc, Gc, Bc) into HSV; h, hue values of the input colors (Rc,Gc,Bc). As a result, Hue=h and Equation (3) is rewritten into:

$$(Rt, Gt, Bt) = (Rc, Gc, Bc) + s'v'(r, g, b) \quad (4)$$

In Equation (4), the colors (Rc, Gc, Bc) on the reference monitor are converted into desired target colors (Rt, Gt, Bt) by the RGB correcting values (r, g, b). Both the input colors (Rc, Gc, Bc) and the target colors (Rt, Gt, Bt) are stored in the first storage unit 12 (FIG. 2). In FIG. 4, the first storage unit 12 is exemplified which exhibits a relationship between the input colors RGB values and the corresponding target RGB values along with index numbers. However, no restriction is given to FIG. 4 when target colors can be read out of the storage unit in correspondence to the input colors.

Now, consideration is made about an object monitor having different color characteristics (concerned with white and hue of RGB fluorescent material) from the reference monitor and about whether or not the same effect can be accomplished between the reference and the object monitors. As mentioned before, (Rt, Gt, Bt) and (r, g, b) in Equation (4) all depend on each device and do not make sense even if they are applied to the object monitor. In other words, the same colors can not be realized on the object monitor when the (Rt, Gt, Bt) and (r, g, b) are used for the object monitor.

In other words, the above-mentioned problem may be substituted into a problem of reproducing the same colors on color image devices having different color characteristics. This enables application of a color management problem.

As regards the reference monitor, obtained are the input colors or center colors (R1, G1, B1) to be corrected and their target colors (tR1, tG1, tB1). On the other hand, unknown color correcting parameters can be calculated on the object monitor by applying the color appearance model so that the same correcting effect can be apparently attained on the object monitor. Such a color appearance model or a color adaptation model may be CUELAB, CIECAM97s2, or the like proposed by the CIE.

At first, let the input color set 5 prior to the color correction and the color correcting parameter set 4 corresponding to the input color set 5 be derived from the reference monitor. The input color set 5 and the corresponding color correcting parameter set 4 are assumed to be sufficiently scattered in a color distribution space of a correcting zone.

The color correcting processing is executed by the use of the input color set 5 and the color correcting parameter set 4 derived from the reference monitor to calculate the output color set after color correction.

Next, selected ones of the input RGB values ($R_2$, $G_2$, $B_2$) on the color distribution area of the correction zone are displayed on the object monitor. Since the object monitor is different in the color characteristics from the reference monitor, colors displayed on the object monitor are apparently different from those displayed on the reference monitor even when the same RGB values are used on both the reference and the object monitors. It is to be noted that the selected input RGB values ($R_2$, $G_2$, $B_2$) that are prepared for the input colors previously obtained for the reference monitor may be used as RGB values in the color distribution area of the correction zone of the object monitor. This is because the input colors prepared for the reference monitor are voluntarily extracted from the correction zone of the natural image and, even if the natural image is displayed on the object monitor, the input colors themselves are common to the object monitor also from viewpoint of the colors included in the correction zone.

Under the circumstances, the target colors ($tR_2$, $tG_2$, $tB_2$) on the object monitor are calculated in correspondence with the selected inputs ($R_2$, $G_2$, $B_2$) included in the color distribution area of the correction zone on the object monitor. Thereafter, RGB correcting values are calculated from both the input color set and the target color set by the use of a known method. As an example, description will be made about using the CIELab model as the color appearance model. In this event, let XYZ of a white component on the reference monitor be represented by ($Xw_1$, $Yw_1$, $Zw_1$) while XYZ of a white component on the object monitor are represented by ($Xw_2$, $Yw_2$, $Zw_2$). In addition, it is assumed that calculations have been previously made about a transformation matrix $RX_1$ of the reference monitor from RGB to XYZ, a transformation matrix $RX_2$ of the object monitor from RGB to XYZ, and an inverse transformation matrix $RX_2$ of $RX_2$ from XYZ to RGB.

Referring to FIG. 2 again also, the first calculator unit 13 calculates the color perception values of the target colors in connection with the input colors and the target colors stored in the first storage unit 12. Thus, the color perception values of the target colors are calculated about the reference monitor side. Specifically, when an i-th input color ($R_{1i}$, $G_{1i}$, $B_{1i}$) and the corresponding target color ($tR_{1i}$, $tG_{1i}$, $tB_{1i}$) after color correction are given, the respective perception values Lab are calculated by the first calculator unit 13. On calculating Lab, ($Xw_1$, $Yw_1$, $Zw_1$) are designated as the white component.

On the reference monitor, the color perception values ($L_{1i}$, $a_{1i}$, $b_{1i}$) of the i-th input color ($R_{1i}$, $G_{1i}$, $B_{1i}$) are given by:

$$\begin{bmatrix} X_{1i} \\ Y_{1i} \\ Z_{1i} \end{bmatrix} = RX_1 \begin{bmatrix} R_{1i} \\ G_{1i} \\ B_{1i} \end{bmatrix} \quad (5)$$

$$\begin{bmatrix} L_{1i} \\ a_{1i} \\ b_{1i} \end{bmatrix} = F((X_{1i}, Y_{1i}, Z_{1i}), (X_{w1}, Y_{w1}, Z_{w1})) \quad (6)$$

where the function F( ) is representative of a transformation function from XYZ to Lab.

As regards the target colors corresponding to the i-th input color, the color perception values ($tL_{1i}$, $ta_{1i}$, $tb_{1i}$) of the target colors are given by:

$$\begin{bmatrix} tX_{1i} \\ tY_{1i} \\ tZ_{1i} \end{bmatrix} = RX_1 \begin{bmatrix} tR_{1i} \\ tG_{1i} \\ tB_{1i} \end{bmatrix} \quad (7)$$

$$\begin{bmatrix} tL_{1i} \\ ta_{1i} \\ tb_{1i} \end{bmatrix} = F((tZ_{1i}, tY_{1i}, tZ_{1i}), (X_{w1}, Y_{w1}, Z_{w1})) \quad (8)$$

The color perception values of the input and the target colors calculated by the first calculator unit 13 are stored in the second storage unit 14 that is illustrated in FIG. 5. The second storage unit 14 may not be restricted to the illustrated structure but may have a structure such that the color perception values of the input and the target colors can be read out in pairs.

On the other hand, the second calculator unit 15 calculates the color perception values ($L_2$, $a_2$, $b_2$) of the input colors ($R_2$, $G_2$, $B_2$) on the object monitor in accordance with the following equations (9) and (10), namely;

$$\begin{bmatrix} X_2 \\ Y_2 \\ Z_2 \end{bmatrix} = RX_2 \begin{bmatrix} R_2 \\ G_2 \\ B_2 \end{bmatrix} \quad (9)$$

$$\begin{bmatrix} L_2 \\ a_2 \\ b_2 \end{bmatrix} = F((X_2, Y_2, Z_2), (X_{w2}, Y_{w2}, Z_{w2})) \quad (10)$$

The color difference searching unit 16 makes access to the second storage unit 14 to select, from the stored input color set of the reference monitor, a color that has a minimum color difference with the color perception values ($L_2$, $a_2$, $b_2$). In other words, the selected color has a minimum difference in the color perception values and is specified by the color perception values ($L_1$, $a_1$, $b_1$) that are closest to those of the color perception values ($L_2$, $a_2$, $b_2$) on the object monitor. The target color that corresponds to the selected color is also detected by the color difference searching unit 16 and has the color perception values ($tL_1$, $ta_1$, $tb_1$). The color perception values ($tL_1$, $ta_1$, $tb_1$) of the target color determined on the reference monitor are set as the color perception values (tL, ta, tb) of the target color that corresponds to the selected input color ($R_2$, $G_2$, $B_2$) on the object monitor. In this case, the following equation (11) holds.

$$(tL, ta, tb) = (tL_1, ta_1, tb_1). \quad (11)$$

The third calculator unit 17 calculates the RGB values ($tR_2$, $tG_2$, $tB_2$) on the object monitor in correspondence with the color perception values (tL, ta, tb) on the basis of the following equations.

$$\begin{bmatrix} tX_2 \\ tY_2 \\ tZ_2 \end{bmatrix} = F^{-1}((tL, ta, tb), (X_{w2}, Y_{w2}, Z_{w2})) \quad (12)$$

$$\begin{bmatrix} tR_2 \\ tG_2 \\ tB_2 \end{bmatrix} = XR_2 \begin{bmatrix} tX_2 \\ tY_2 \\ tZ_2 \end{bmatrix} \quad (13)$$

where the white component is given by $(X_{w2}, Y_{w2}, Z_{w2})$ and the inverse function $F^{-1}( )$ represents a function of transforming Lab to XYZ.

In the color correcting parameter calculator unit 18, the RGB values (r', g', b') are calculated in response to the input color (R2, G2, B2) and the corresponding target color (tR$_2$, tG$_2$, tB$_2$) after correction and are given by:

$$(r', g', b')=((tR_2, tG_2, tB_2)-(R_2, G_2, B_2))/s_2/v_2 \quad (14)$$

where $s_2$ and $v_2$ are representative of s and v values obtained by transforming the input color (R$_2$, G$_2$, B$_2$) on the object monitor to HSV.

The above-mentioned calculations are executed in connection with all of the input colors to obtain the color correcting parameters on the object color monitor. The color correcting parameters are produced as a color parameter set 8 for the object color monitor which is different in a RGB fluorescent material and a hue of a white component from the reference monitor. The model for apparently predicting the same colors as the object monitor may be a color appearance model of CIECAM97s2, RLAB, Nayatani, LLAB, instead of CIELAB. At any rate, inasmuch as it is possible to calculate the color perception values of a human by the use of each of the above-mentioned models, the color correcting parameters can be calculated in connection with the object monitor in a manner similar to that mentioned conjunction with the CIELAB.

Figure 6:
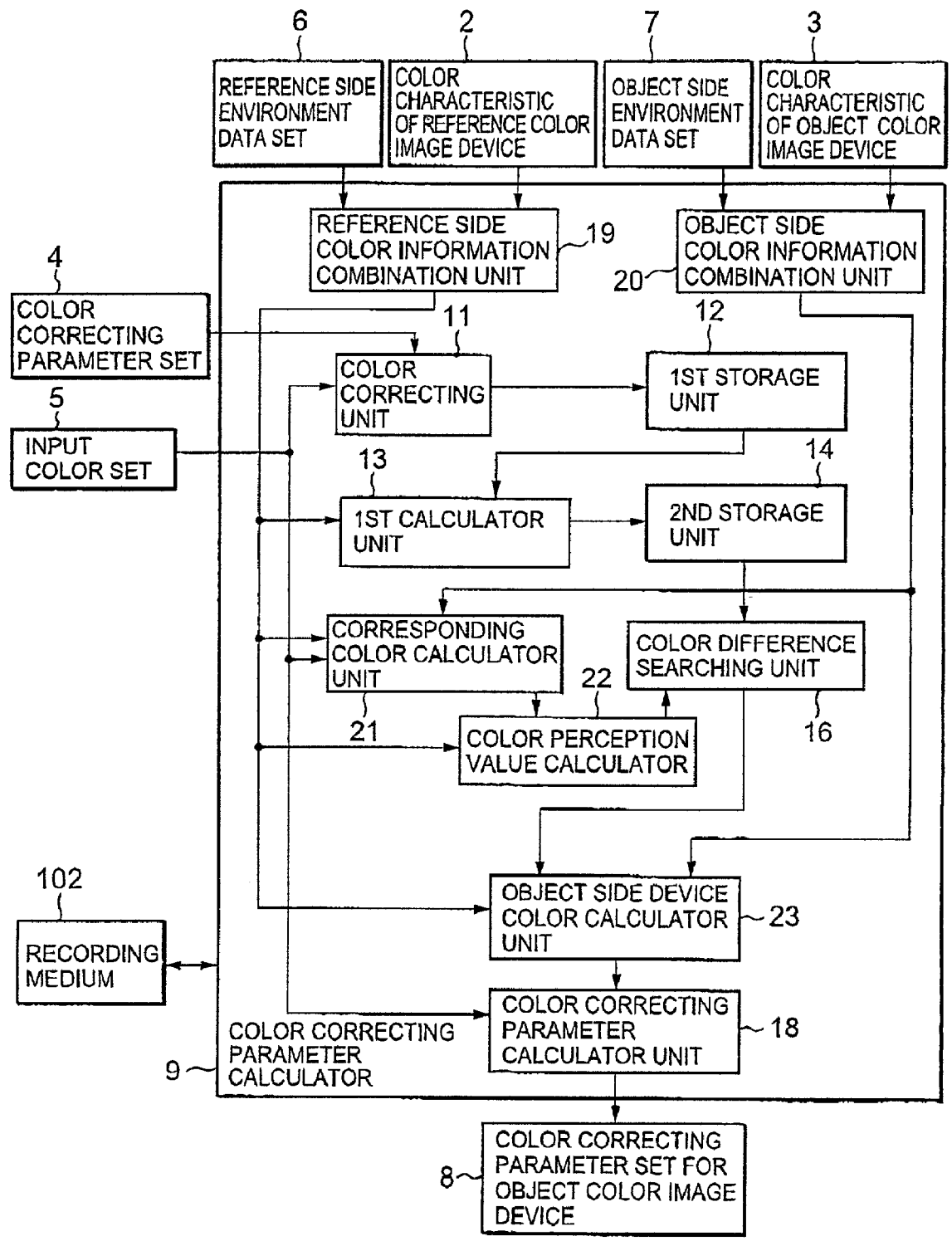
FIG. 6 shows a block diagram of a color correcting parameter calculator according to another embodiment of this invention.

Referring to FIG. 6, description will be made about a color correcting parameter calculator 9 according to another embodiment of this invention. The illustrated calculator 9 comprises similar parts that are designated by like reference numerals and that are operable in the manner mentioned with reference to FIG. 2. However, it is to be noted that a chromatic adaptation model is used in the calculator 9 illustrated in FIG. 6 in lieu of the color appearance model.

The illustrated color correcting parameter calculator 9 is given color characteristics 2 of a reference color image device, color characteristics 3 of an object color image device, a color correcting parameter set 4, an input color set 5, reference side observation environment data 6, and object side observation environment data 7, like in FIG. 2.

The illustrated color correcting calculator 9 is similar in structure to the calculator 1 shown in FIG. 2 except that the calculator 9 has a reference side color information combination unit 19, an object side color information combination unit 20, a corresponding color calculator unit 21, a color perception value calculator unit 22, and an object device color calculator unit 23. Like in FIG. 2, the color correcting calculator 9 has the color correcting unit 11, the first storage unit 12 for input and target colors, the first calculator unit 13 for calculating a reference side color perception values, the second storage unit 14 for storing color perception values of the input and the target colors, the color difference searching unit 16, and the color correcting parameter unit 18. All of the above-enumerated units are operated in accordance with a program stored in a recording medium 102.

Figure 7:
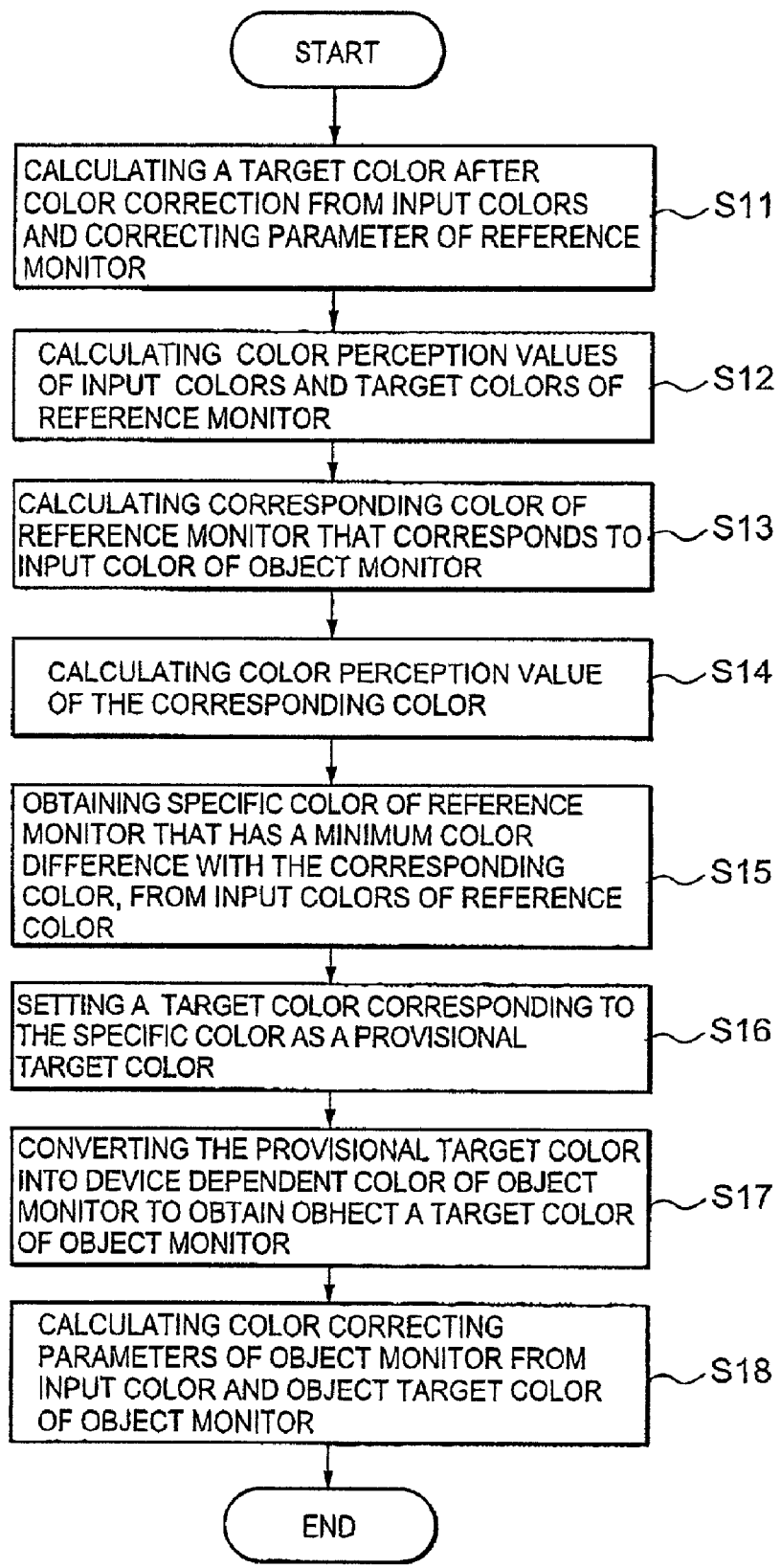
FIG. 7 shows a flow chart for use in describing operation of the color correcting parameter calculator illustrated in FIG. 6.

Referring to FIG. 7, a flow chart is illustrated to describe operation of the color correcting parameter calculator which is shown in FIG. 6 and which is operated by the use of the chromatic adaptation model. The processing illustrated in FIG. 7 is implemented in accordance with the program stored in the recording medium 102.

The color correcting parameter calculator 9 calculates, by the use of the input color and its color correcting parameter, a target color of the reference monitor that is corrected (step S11 in FIG. 7). Thereafter, color perception values of the input and the target colors on the reference monitor are calculated by the use of the color appearance model (step S12 in FIG. 7).

Next, the color correcting parameter calculator 9 makes an input color on the object monitor correspond to a corresponding color on the reference monitor by the use of the chromatic adaptation model (step S13) and calculates a color perception value of the corresponding color by the use of the color appearance model (step S14).

Subsequently, the color correcting parameter calculator 9 finds out, from the input color set on the reference monitor, an input color, namely, a specific color that has a minimum color difference with the corresponding color (step S15 in FIG. 7) and that may be also called a selected input color. A target color that corresponds to the selected input color with the minimum color difference is determined as a selected target color corresponding to the corresponding color (step S16 in FIG. 7).

Furthermore, the color correcting parameter calculator 9 calculates a device dependent color on the object monitor with reference to the selected target color obtained at the step 16 to obtain an object target color on the object monitor (step S17 in FIG. 7). A color correcting parameter on the object monitor is calculated on the basis of the input color on the object monitor and the object target color (step S18 in FIG. 7).

The above-mentioned operation will be described in detail below with reference to FIG. 6 again. The reference side color information combination unit 19 is given the color characteristics 2 of the reference color image device and the reference side observation environment data 6 to be combined together to produce a reference side combined information signal. On the other hand, the object side information combination unit 20 is given the color characteristics 3 of the object color image device and the object side observation environment data 7 to be combined together to produce an object side combined information signal.

Like in FIG. 2, the color correcting unit 11 is operable in response to the input color set 5 composed of a plurality of color data prior to color correction and the color correcting parameter set 4 composed of color correcting parameters corresponding to each input color. The color correcting unit 11 executes correction processing in connection with all of the input colors to obtain target colors and to successively store the input colors and the corresponding target colors into the first storage unit 12.

The first calculator unit 13 is for calculating the reference side color perception values in a manner similar to that mentioned in conjunction with FIG. 2. Specifically, the first calculator unit 13 is supplied with the reference side combined information signal combined by the reference side color information combination unit 19 and the input color and the target color stored in the first storage unit 12 to calculate the reference side color perception values of all of the input colors and the target colors. The calculated color perception values are stored in the second storage unit 14.

In the illustrated example, the corresponding color calculator unit 21 is given the input color set 5, the reference side combined information signal, and the object side combined information signal to calculate a corresponding color of the reference side device relative to the input color of the object side color image device. The color perception value calculator 22 is given the reference side combined information signal and the corresponding color to calculate the color perception value of the corresponding color.

The color difference searching unit 16 searches for a reference side input color that has a minimum color difference with the corresponding color. To this end, the second storage unit 14 is searched to find out the reference side input color of the minimum color difference and its target color.

The illustrated object side device color calculator unit 23 is given the object side combined information signal from the object side color information combination unit 20 and the reference side combined information signal from the reference side color information combination unit 19. In addition, the target color is also given from the color difference searching unit 16 to the object side device color calculator unit 23. In consequence, the target color obtained by the color difference searching unit 16 is converted into device dependent color data of the target color on the object side color image device. The color correcting parameter unit 18 calculates the color correcting parameters from the input color and the device dependent color data of the target color.

In the illustrated color correcting parameter calculator 9, the color correcting unit 11 carries out the processing shown at the step S11 in FIG. 7 and the first calculator unit 13, namely, the reference side color perception value calculator unit 13 carries out the processing shown at the step S12. The above-mentioned units and the steps S11 and S13 are similar to those shown in FIG. 2 and will not be described any longer.

Herein, the reference side color information combination unit 19 combines the color characteristics 2 of the reference color image device with the reference side observation environment data 6 into the reference side combination information signal. On the other hand, the object side color information combination unit 20 combines the color characteristics of the object color image device and the object side observation environment data 7 into the object side combination information signal.

Thus, the illustrated color correcting parameter calculator 9 has the reference side and the object side information units 19 and 20 so as to simplify its structure and to facilitate understanding. However, even if both the reference side and the object side information units 19 and 20 may be omitted, similar operation can be achieved.

Next, description will be made about the operation that is executed by the corresponding color calculator unit 21 and that corresponds to the processing shown at the step S13 in FIG. 7. At first, let the input color on the object monitor (namely, object color image device) be represented by $(R_2, G_2, B_2)$ and its corresponding color on the reference monitor (namely, reference color image device) be represented by $(X'_2, Y'_2, Z'_2)$. In this case, the corresponding color $(X'_2, Y'_2, Z'_2)$ is given by:

$$\begin{bmatrix} X_2 \\ Y_2 \\ Z_2 \end{bmatrix} = RX_2 \begin{bmatrix} R_2 \\ G_2 \\ B_2 \end{bmatrix} \tag{15}$$

$$\begin{bmatrix} X'_2 \\ Y'_2 \\ Z'_2 \end{bmatrix} = CAM((X_2, Y_2, Z_2), (X_{w2}, Y_{w2}, Z_{w2}), (X_{w1}, Y_{w1}, Z_{w1})) \tag{16}$$

In the above-equation (16), the function CAM( ) is representative of a function for defining color conversion by the use of the chromatic adaptation model. When such a chromatic adaptation model is von Kries model or is implemented by a method described in Japanese Patent Unexamined Publication No. 2000-113174, it is necessary to give XYZ values of the white component to be converted and the corresponding converted values XYZ of the white component. In Equation (16), second factors $(Xw_2, Yw_2, Zw_2)$ within the function CAM( ) shown on the right-hand side represent the XYZ values of the white component to be converted and are obtained from the object side color information combination unit 20. On the other hand, third factors $(Xw_1, Yw_1, Zw_1)$ within the function CAM represent the converted XYZ values of the white component and are given from the reference side color information combination unit 19 and are obtained from the reference side color information combination unit 19.

The color perception calculator unit 22 is supplied with the corresponding color on the reference monitor in accordance with Equation (16) and calculates the color perception values $(L_2, a_2, b_2)$ of the corresponding color $(X'_2, Y'_2, Z'_2)$. The color perception values $(L_2, a_2, b_2)$ are given by:

$$\begin{bmatrix} L_2 \\ a_2 \\ b_2 \end{bmatrix} = F((X'_2, Y'_2, Z'_2), (X_{w1}, Y_{w1}, Z_{w1})) \tag{17}$$

where F( ) is the same function as that shown in Equation (6).

The color difference searching unit 16 selects, from the input color set of the reference monitor, a color that has a minimum color difference (a minimum difference in color perception values) relative to $(L_2, a_2, b_2)$ calculated in accordance with Equation (17). Subsequently, a target color $(tR_1, tG_1, tB_1)$ is selected which corresponds to the input color of the minimum color difference on the reference monitor. The target color $(tR_1, tG_1, tB_1)$ is made to correspond to an input color on the object monitor and is set as a target color of the corresponding color on the reference monitor relative to the input color on the object monitor.

The object side device color calculator unit 23 responds to the target color $(tR_1, tG_1, tB_1)$ obtained by the color difference searching unit 16 and calculates the device dependent color that is specified by RGB values $(tR_2, tG_2, tB_2)$ on the object monitor in correspondence with the target color $(tR_1, tG_1, tB_1)$.

Specifically, the target color $(tR_1, tG_1, tB_1)$ which is the device dependent color on the reference monitor is converted into a non-device dependent color $(tX_1, tY_1, tZ_1)$ given by:

$$\begin{bmatrix} tX_1 \\ tY_1 \\ tZ_1 \end{bmatrix} = RX_1 \begin{bmatrix} tR_1 \\ tG_1 \\ tB_1 \end{bmatrix} \tag{18}$$

Next, calculation is made to obtain that corresponding color $(tX_2, tY_2, tZ_2)$ on the object monitor which corresponds to the target color $(tX_1, tY_1, tZ_1)$ on the reference monitor. The corresponding color $(tX_2, tY_2, tZ_2)$ is given by the chromatic adaptation model represented by:

$$\begin{bmatrix} tX'_2 \\ tY'_2 \\ tZ'_2 \end{bmatrix} = CAM((tX_1, tY_1, tZ_1), (X_{w1}, Y_{w1}, Z_{w1}), (X_{w2}, Y_{w2}, Z_{w2})) \tag{19}$$

The corresponding color $(tX_2, tY_2, tZ_2)$ which is a device dependent color is converted into a device dependent color ($tR_2$, $tG_2$, $tB_2$) on the object device. The device dependent color ($tR_2$, $tG_2$, $tB_2$) on the object device is given by:

$$\begin{bmatrix} tR_2 \\ tG_2 \\ tB_2 \end{bmatrix} = XR_2 \begin{bmatrix} tX'_2 \\ tY'_2 \\ tZ'_2 \end{bmatrix} \quad (20)$$

The device dependent color ($tR_2$, $tG_2$, $tB_2$) shown by Equation (20) is set as the target color corresponding to the input color on the object monitor.

Finally, the color correcting unit 18 executes calculation to obtain color correcting parameter values RGB(r', g', b') which are given on the object monitor by:

$$(r', g', b') = ((tR_2, tG_2, tB_2) - (R_2, G_2, B_2))/s_2/v_2 \quad (21)$$

Such color correcting parameter values RGB (r', g', b') serve to attain the target color ($tR_2$, $tG_2$, $tB_2$) after color correction in correspondence with the input color ($R_2$, $G_2$, $B_2$) on the object monitor. As mentioned before, the chromatic adaptation model used in the color correcting calculator 9 may be von Kries model, the method disclosed in Japanese Patent Unexamined Publication No. 2000-113174, or the like.

Figure 8:
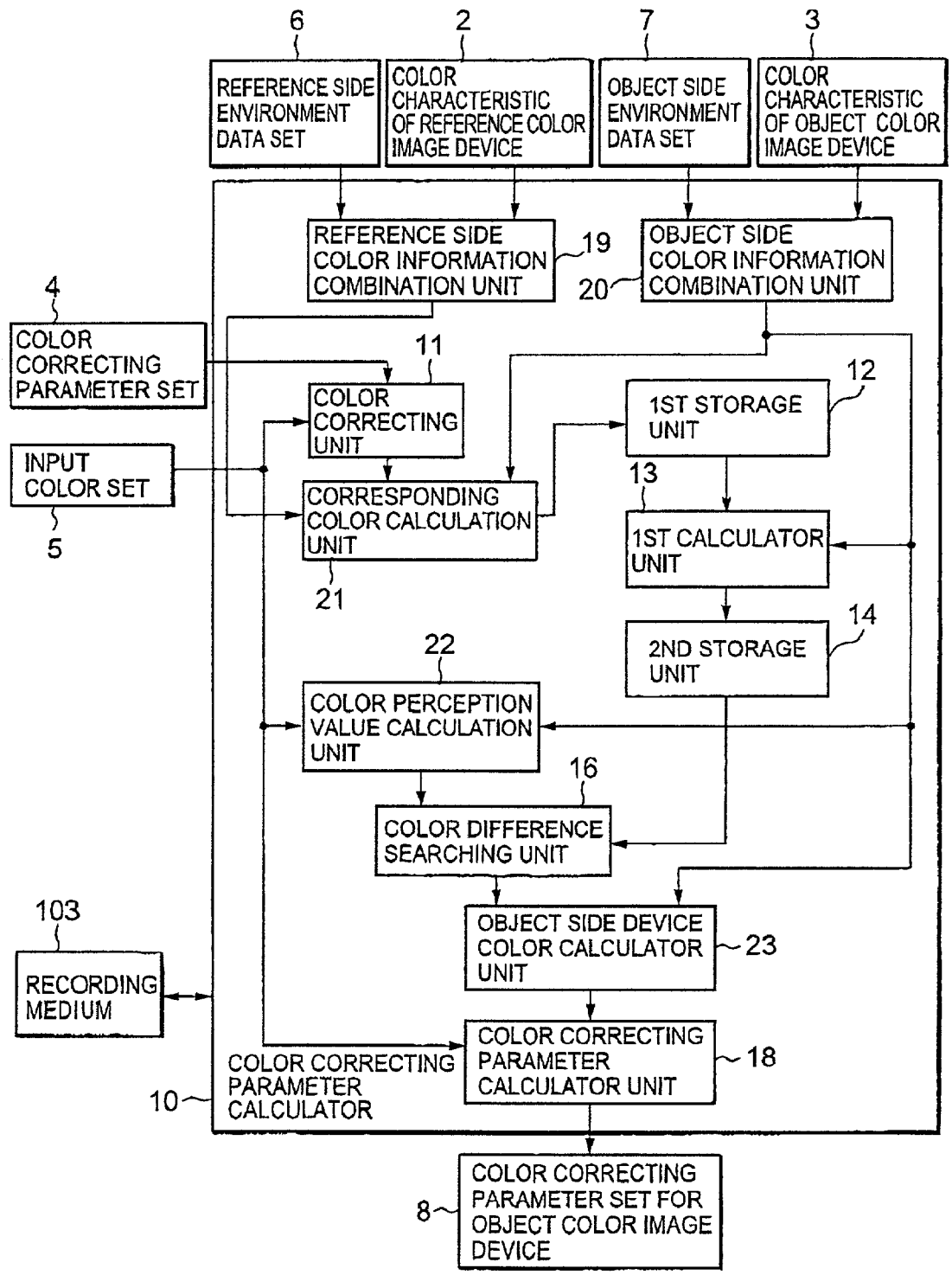
FIG. 8 shows a block diagram of a color correcting parameter calculator according to yet another embodiment of this invention.

Referring to FIG. 8, a color correcting parameter calculator 10 according to another embodiment of this invention utilizes the chromatic adaptation model similar to that illustrated in FIG. 6 and is operable in response to color characteristics 2 of a reference color image device (will be called a reference monitor) and characteristics 3 of an object color image device (an object monitor). In addition, a color correcting parameter set 4, an input color set 5, reference side observation environment data, and object side observation environment data are also given to the illustrated color correcting parameter calculator 10.

The illustrated color correcting parameter calculator 10 has a reference side color information combination unit 19, an object side color information combination unit 20, a color correcting unit 11, a first storage unit 12 for input and target colors, a first calculator unit 13 for calculating color perception values on the reference side, and a second storage unit 14 for color perception values of the input and the target colors, like in FIG. 6.

Moreover, the color correcting parameter calculator 10 further has a corresponding color calculator unit 21, a color difference searching unit 16, a color perception value calculator unit 22, an object side device color calculator unit 23, and a color correcting parameter calculator unit 18, all of which are operable in a manner similar to those illustrated in FIG. 6. However, it is to be noted in FIG. 8 that arrangement of each unit is different from that illustrated in FIG. 6. At any rate, the color correcting parameter calculator 10 illustrated in FIG. 8 is also operated in accordance with a program stored in a recording medium 103 to produce a set 8 of color correcting parameters for the object color image device or the object monitor.

Figure 9:
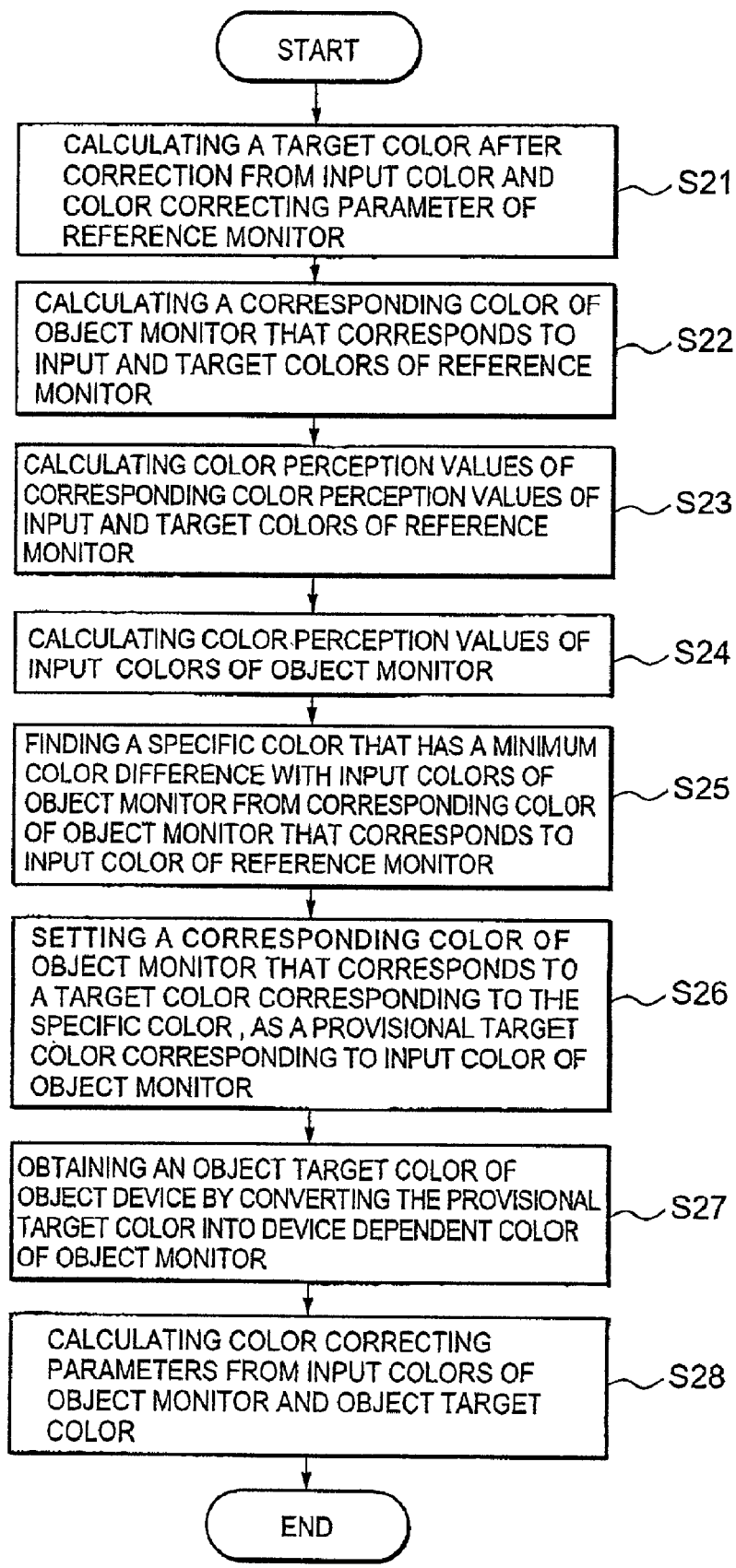
FIG. 9 shows a flow chart for use in describing operation of the color correcting parameter calculator illustrated in FIG. 7.

Referring to FIG. 9, description will be made about operation of the color correcting parameter device 10 illustrated in FIG. 8. Like in FIGS. 2 and 6, the operation or processing shown in FIG. 9 is executed in accordance with the program stored in the recording medium 103. At first, the color correcting parameter device 10 calculates a target color after color correction by the use of the input colors on the reference monitor and their color correcting parameters (step S21 in FIG. 9) and also calculates that corresponding color on the object monitor which corresponds to the input and its target colors on the reference monitor (step S22 in FIG. 9).

Furthermore, the color correcting parameter calculator 10 calculates color perception values of that corresponding color on the object monitor which is calculated at step S22 and which corresponds to the input and its target colors on the reference monitor by the use of a color appearance model. Thereafter, color perception values of the input color on the object monitor are calculated by the color correcting parameter calculator 10 by the use of the color appearance model (step S24 in FIG. 9).

The color correcting parameter calculator 10 is thereafter operated in response to that corresponding color on the object monitor which corresponds to the input color on the reference monitor and detects a color that has a minimum color difference with the input color on the object monitor (step S25 in FIG. 9).

The color correcting parameter calculator 10 calculates a target color corresponding to the input color which has the minimum color difference and which is calculated at the step S25. In addition, a corresponding color on the object monitor is calculated which corresponds to the target color and is set as a target color corresponding to the input color on the object monitor (step S26 in FIG. 9).

Subsequently, the color correcting parameter calculator 10 calculates a device dependent color on the object monitor in response to the target color obtained at the step S26 (step S27 in FIG. 9). Furthermore, the color correcting parameter calculator 10 calculates the color correcting parameters on the object monitor from both the input color on the object monitor and the target color calculated at the step S27 (step S28).

As illustrated in FIG. 8, the color correcting parameter calculator 10 comprises similar units designated by the same reference numerals in FIG. 6 but has the arrangement different from that illustrated in FIG. 6. Therefore, the remaining units will not be described any longer.

Figure 10:
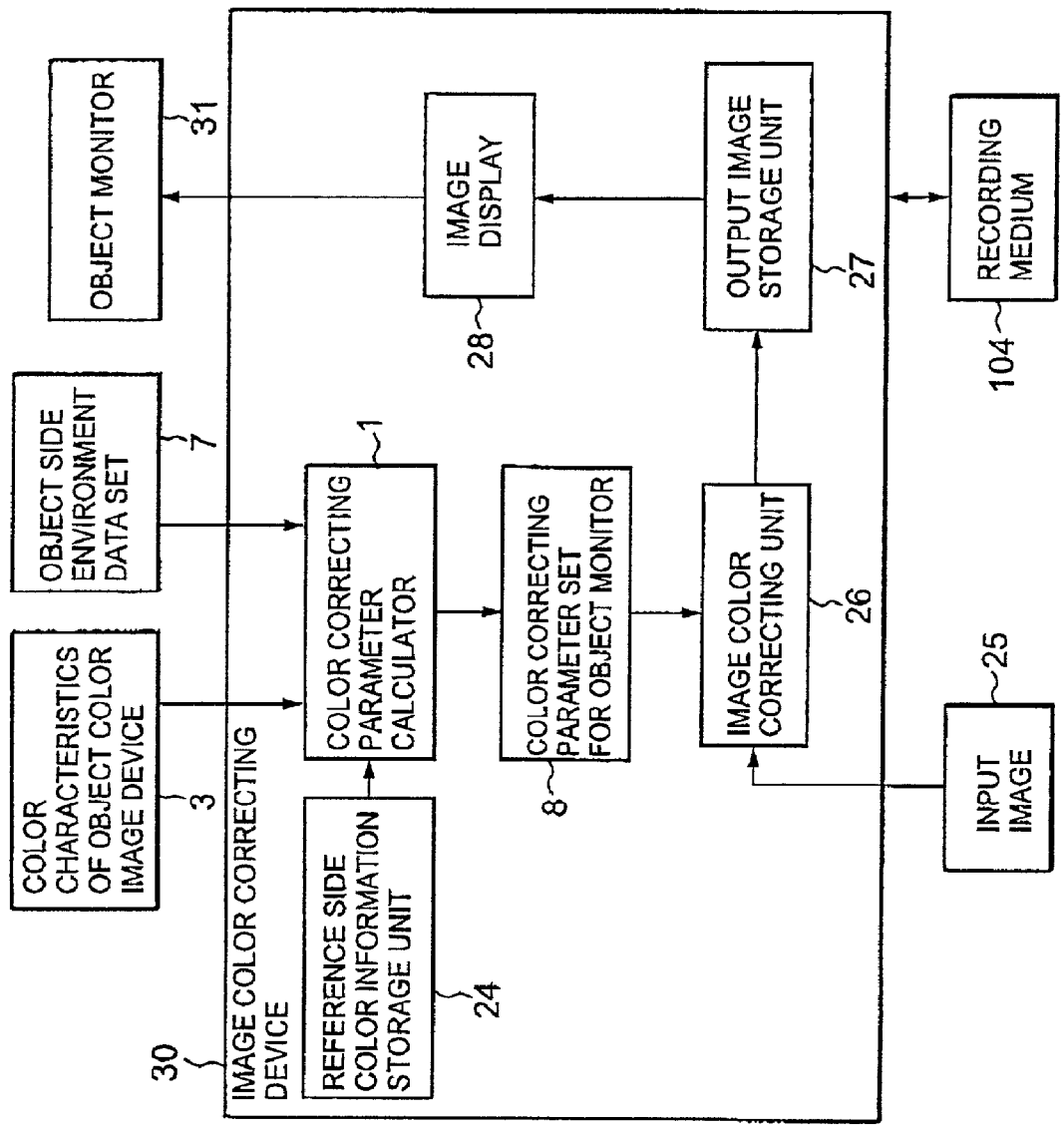
FIG. 10 shows a block diagram of an image color correcting device which includes the color correcting parameter calculator according to this invention.

Referring to FIG. 10, an image color correcting device 30 according to another embodiment of this invention is connected to an object color image device (namely, an object monitor) and is given color characteristics 3 on an object color image device (namely, an object monitor), reference side observation environment data 7, and input images 25.

The illustrated image color correcting device 30 has a reference side color information storage unit 24, a color correcting parameter calculator 1, a color correcting parameter set 8 for the object monitor 31, an image color correcting unit 26, an output image storage unit 27, and an image display unit 28. With this device, an image which is subjected to color correction is displayed on the object monitor 31. Each unit included in the illustrated image color correcting device is controlled by a program stored in a recording medium 104 so as to execute processing assigned to each unit.

With this structure, the reference side color information storage unit 24 in the illustrated image color correcting device 30 stores predetermined color characteristics 2 of the reference monitor, reference side observation environment data 6, a color correcting parameter set 4, and an input color set 5. The color characteristics 3 and the observation environment data 7 on the object monitor are given to the color correcting parameter calculator 1 included in the image color correcting device 30.

The illustrated color correcting parameter calculator 1 is coupled to the reference side color information storage unit 24 to read the color characteristics on the reference monitor, the reference side observation environment data, the color correcting parameter set, and the input color set, all of which are needed to calculate the color correcting parameters. Thereafter, the color correcting parameter calculator 1 produces the color parameter set 8 for the object monitor.

The image color correcting unit 26 executes color correcting processing of the input image 25 given to the image color correcting device 30 and stores a compensated image into the output image storage unit 27. In this case, the color correcting parameter set 8 for the object monitor is used as color correcting parameters. The image display unit 28 supplies the stored image in the output image storage unit 27 to the object monitor 31. Thus, the compensated image is displayed on the object monitor 31.

In FIG. 10, the color correcting parameter calculator 1 illustrated in FIG. 3 is used in the image color correcting device 30 but may be replaced by another color correcting parameter calculator 9 or 10 illustrated in FIG. 6 or 8.

According to the image color correcting device 30, it is possible to automatically calculate color correcting parameters for an object color image device without any re-evaluating experiment, by using color correcting parameters adjusted to a reference color image device different in color characteristics from the object color image device.

Thus, the re-evaluation experiment can be omitted on calculating the color correcting parameters for the object color image device with reference to the color correcting parameters adjusted to the reference color image device Therefore, it is possible to save time and labor so as to calculate the color correcting parameters for the object color image device.

In addition, a color correcting effect similar to the reference color image device can be accomplished on the object color image device by the use of the color correcting parameters that are calculated for the object color image device with reference to the color correcting parameters adjusted to the reference color image device.

As mentioned before, the color parameter correcting calculator according to this invention is advantageous in that color correcting parameters for an object color image device can be automatically calculated with reference to color correcting parameters calculated for a reference color image device different from the object color image device in color characteristics.

While this invention has thus far been described in conjunction with several embodiments thereof, it will be readily possible for those skilled in the art to put this invention into practice in various other manners. For example, the color correcting parameter calculator and program according to this invention can be realized by calculating the object target colors in relation to the reference target colors and the input colors, by selecting an optimum one of the object target colors in accordance with a predetermined algorithm, and by calculating the color correcting parameters from the optimum object target color. In addition, the recording medium may be, for example, a CD-ROM, a hard disk, or any other recording media. The program may be distributed through an internet.

What is claimed is:

1. A microprocessor system having a color correcting parameter calculator for use in calculating color correcting parameters of an object color image device used to correct colors of said object color image device where said color correcting parameters of the object color image device are different from a reference color image device, comprising:
    means for calculating a reference target color after color correction in response to input colors and their color reference correcting parameters related to the reference color image device;
    means for calculating reference target color perception values and reference color perception values in connection with the reference target colors and the input colors, respectively, together with object color perception values in connection with the input colors given also to the object color image device;
    means for searching for a specific color which has a minimum color difference with each input color, in response to the reference target color perception values, the reference color perception values, and the object color perception values;
    means for calculating an object target color in connection with the object color image device on the basis of the reference target color perception values corresponding to the specific color; and
    means for calculating the object color correcting parameters of the object color image device on the basis of the object target color and each of the object input colors, wherein the calculated object color correcting parameters are used to correct colors of the object color image device.

2. A microprocessor system having a color correcting parameter calculator for use in calculating color correcting parameters of an object color image device used to correct colors of said object color image device where said color correcting parameters of the object color image device are different from a reference color image device, comprising:
    color correcting means for calculating reference target colors after color correction in response to input colors and their reference color correcting parameters calculated in connection with the reference color image device;
    a reference side storage unit for storing the input colors and the reference target colors calculated by the color correcting means;
    color perception value calculating means for calculating reference color perception values concerned with the input colors and the reference target colors stored in the reference side storage unit, together with object color perception values concerned with the input colors given to the object color image device;
    a color perception value storage unit for storing the reference color perception values of the input colors and the reference color perception values concerned with the reference color image device;
    color difference searching means for searching for a specific color that has a minimum color difference with the input colors given to the object color image device and that is selected from the input colors given to the reference color image device;
    object device dependent color calculating means for rendering the reference color perception values of the reference target colors into object color perception values of object target colors corresponding to the input colors given to the object color image device, to get a provisional object target color from the object color perception values, to convert the provisional object target color into a device dependent color related to the object color image device, and to thereby obtain the object target colors from the provisional object target color; and
    color correcting parameter calculating means for calculating the object color correcting parameters of the object color image device on the basis of the input colors and the object target colors related to the object color image device, wherein the calculated object color correcting parameters are used to correct colors of the object color image device.

3. A microprocessor system having a color correcting parameter calculator for use in calculating color correcting parameters of an object color image device used to correct colors of said object color image device where said color correcting parameters of the object color image device are different from a reference color image device, comprising:
- color correcting means for calculating reference target colors after color correction in response to input colors and their reference color correcting parameters calculated in connection with the reference color image device;
- reference side color perception value calculating means for calculating color perception values of the reference target colors and the input colors given to the reference color image device;
- corresponding color calculating means for calculating that reference corresponding colors on the reference color image device which correspond to the input colors given to the object color image device;
- color perception value calculating means for calculating color perception values of the reference corresponding colors;
- color difference searching means for searching for a specific color that has a minimum color difference with the reference corresponding colors, from the input colors given to the reference color image device;
- object side device color calculating means for rendering a specific one of the reference target colors of the reference color image device that corresponds to the specific color, into a target corresponding color of the specific color, to convert the target corresponding color into a device dependent color on the object color image device and to thereby obtain an object target color of the object color image device; and
- color correcting means for calculating the color correcting parameters of the object color image device with reference to the object target color and the input colors given to the object color image device,
- wherein the calculated object color correcting parameters are used to correct colors of the object color image device.

4. A microprocessor system having a color correcting parameter calculator for use in calculating color correcting parameters of an object color image device used to correct colors of said object color image device where said color correcting parameters of the object color image device are different from a reference color image device, comprising:
- color correcting means for calculating reference target colors after color correction in response to input colors and their reference color correcting parameters calculated in connection with the reference color image device;
- object corresponding color calculating means for calculating object corresponding colors of the object color image device on the basis of the input colors of the reference color image device and the reference target colors;
- reference side color perception values calculating means for calculating color perception values of the object corresponding colors calculated by the object corresponding color calculating means;
- object color perception value calculating means for calculating color perception values of the input colors of the object color image device;
- color difference searching means for searching for a specific color that has a minimum color difference with the input colors of the object color image device, from the object corresponding colors calculated by the object corresponding color calculating means;
- object side device color calculating means for rendering an object corresponding color of the object color image device that corresponds to a specific one of the reference target colors made to correspond to the specific color calculated by the color difference searching means, into an object target color corresponding to the input colors of the object color image device, to calculate a device dependent color of the object color image device from the object target color and to obtain object target colors on the object color image device; and
- color correcting parameter calculating means for calculating the color correcting parameters of the object color image device on the basis of the input colors of the object color image device and the object target colors of the object color image device,
- wherein the calculated object color correcting parameters are used to correct colors of the object color image device.

5. An image color correcting device including a color correcting parameter calculator which calculates object color correcting parameters of an object color image device used to correct colors of said object color image device on the basis of reference color correcting parameters of a reference color image device different from the object color image device, the color correcting parameter calculator comprising:
- means for calculating a reference target color after color correction in response to input colors and their color reference correcting parameters related to the reference color image device;
- means for calculating reference target color perception values and reference color perception values in connection with the reference target colors and the input colors, respectively, together with object color perception values in connection with the input colors given also to the object color image device;
- means for searching for a specific color which has a minimum color difference with each input color, in response to the reference target color perception values, the reference color perception values, and the object color perception values;
- means for calculating an object target color in connection with the object color image device on the basis of the reference target color perception values corresponding to the specific color; and
- means for calculating the object color correcting parameters of the object color image device on the basis of the object target color and each of the object input colors,
- wherein the calculated object color correcting parameters are used to correct colors of the object color image device.

6. An image color correcting device including a color correcting parameter calculator which calculates object color correcting parameters of an object color image device used to correct colors of said object color image device on the basis of reference color correcting parameters of a reference color image device different from the object color image device, the color correcting parameter calculator comprising:
- color correcting means for calculating reference target colors after color correction in response to input colors and their reference color correcting parameters calculated in connection with the reference color image device;
a reference side storage unit for storing the input colors and the reference target colors calculated by the color correcting means;
color perception value calculating means for calculating reference color perception values concerned with the input colors and the reference target colors stored in the reference side storage unit, together with object color perception values concerned with the input colors given to the object color image device;
a color perception value storage unit for storing the reference color perception values of the input colors and the reference color perception values concerned with the reference color image device;
color difference searching means for searching for a specific color that has a minimum color difference with the input colors given to the object color image device and that is selected from the input colors given to the reference color image device;
object device dependent color calculating means for rendering the reference color perception values of the reference target colors into object color perception values of object target colors corresponding to the input colors given to the object color image device, to convert the object color perception values into device dependent colors related to the object color image device and to thereby obtain the object target colors; and
color correcting parameter calculating means for calculating the object color correcting parameters of the object color image device on the basis of the input colors and the object target colors related to the object color image device,
wherein the calculated object color correcting parameters are used to correct colors of the object color image device.

7. An image color correcting device including a color correcting parameter calculator which calculates object color correcting parameters of an object color image device used to correct colors of said object color image device on the basis of reference color correcting parameters of a reference color image device different from the object color image device, the color correcting parameter calculator comprising:
color correcting means for calculating reference target colors after color correction in response to input colors and their reference color correcting parameters calculated in connection with the reference color image device;
reference side color perception value calculating means for calculating color perception values of the reference target colors and the input colors given to the reference color image device;
corresponding color calculating means for calculating that reference corresponding colors on the reference color image device which correspond to the input colors given to the object color image device;
color perception value calculating means for calculating color perception values of the reference corresponding colors;
color difference searching means for searching for a specific color that has a minimum color difference with the reference corresponding colors, from the input colors given to the reference color image device;
object side device color calculating means for rendering a specific one of the reference target colors of the reference color image device that corresponds to the specific color, into a target corresponding color of the specific color, to convert the target corresponding color into a device dependent color on the object color image device and to thereby obtain an object target color of the object color image device; and
color correcting means for calculating the color correcting parameters of the object color image device with reference to the object target color and the input colors given to the object color image device,
wherein the calculated object color correcting parameters are used to correct colors of the object color image device.

8. An image color correcting device including a color correcting parameter calculator which calculates object color correcting parameters of an object color image device used to correct colors of said object color image device on the basis of reference color correcting parameters of a reference color image device different from the object color image device, the color correcting parameter calculator comprising:
color correcting means for calculating reference target colors after color correction in response to input colors and their reference color correcting parameters calculated in connection with the reference color image device;
object corresponding color calculating means for calculating object corresponding colors of the object color image device on the basis of the input colors of the reference color image device and the reference target colors;
reference side color perception values calculating means for calculating color perception values of the object corresponding colors calculated by the object corresponding color calculating means;
object color perception value calculating means for calculating color perception values of the input colors of the object color image device;
color difference searching means for searching for a specific color that has a minimum color difference with the input colors of the object color image device, from the object corresponding colors calculated by the object corresponding color calculating means;
object side device color calculating means for rendering an object corresponding color of the object color image device that corresponds to a specific one of the reference target colors made to correspond to the specific color calculated by the color difference searching means, into an object target color corresponding to the input colors of the object color image device, to calculate a device dependent color of the object color image device from the object target color and to obtain object target colors on the object color image device; and
color correcting parameter calculating means for calculating the color correcting parameters of the object color image device on the basis of the input colors of the object color image device and the object target colors of the object color image device,
wherein the calculated object color correcting parameters are used to correct colors of the object color image device.

9. A method of calculating object color correcting parameters of an object color image device used to correct colors of said object color image device on the basis of reference color correcting parameters of a reference color image device, comprising the steps of:

calculating a reference target color after color correction in response to input colors and their color reference correcting parameters related to the reference color image device;

calculating reference target color perception values and reference color perception values in connection with the reference target colors and the input colors of the reference color image device;

calculating object color perception values in connection with the input colors given also to the object color image device;

searching for a specific color which has a minimum color difference with each input color of the object color image device, in response to the reference target color perception values, from the input colors of the reference color image device;

setting a specific one of the reference target color perception values that corresponds to the specific color as a specific one of the object color perception values that corresponds to the input colors of the object color image device;

calculating object target colors of the object color image device from the specific one of the object color perception values by converting the specific object color perception value into a device dependent color of the object color image device; and calculating the object color correcting parameters of the object color image device on the basis of the object target colors and each of the object input colors, wherein the calculated object color correcting parameters are used to correct colors of the object color image device.

10. A method of calculating object color correcting parameters of an object color image device used to correct colors of said object color image device on the basis of reference color correcting parameters of a reference color image device, comprising the steps of:

calculating reference target colors after color correction from input colors and their color correcting parameters of the reference color image device;

calculating reference color perception values and reference target color perception values related to the input colors and the reference target colors of the reference color image device;

calculating a reference corresponding color of the reference color image device that corresponds to the input colors of the object color image device;

calculating a corresponding color perception value of the reference corresponding color;

searching for a specific color that has a minimum color difference with the reference corresponding color, from the input colors of the reference color image device;

setting a specific one of the reference target colors that corresponds to the specific color, as a corresponding target color corresponding to the reference corresponding color;

calculating object target colors of the object color image device by converting the corresponding target color into a device dependent color; and calculating the object color correcting parameters from the object target colors and the input colors of the object color image device, wherein the calculated object color correcting parameters are used to correct colors of the object color image device.

11. A method of calculating object color correcting parameters of an object color image device used to correct colors of said object color image device on the basis of reference color correcting parameters of a reference color image device, compiising the steps of:

calculating reference target colors after color correction from input colors and their color correcting parameters of the reference color image device;

calculating object corresponding colors of the object color image device from the input colors of the reference color image device and the reference target colors;

calculating object color perception values of the object corresponding colors of the object color image device;

calculating object input color perception values from the input colors of the object color image device;

searching for a specific color tat has a minimum color difference with the input colors of the object color image device, from the object corresponding colors;

setting a specific one of the object corresponding colors that corresponds to a specific one of the reference target colors corresponding to the specific color, as a corresponding object target color corresponding to the input colors of the object color image device;

calculating object target colors of the object color image device by calculating a device dependent color from the specific one of the object corresponding colors; and calculating the object color correcting parameters of the reference color image device on the basis of the object target colors and the input colors of the object color image device, wherein the calculated object color correcting parameters are used to correct colors of the object color image device.

12. A program for use in executing, by a computer, a method of calculating object color correcting parameters of an object color image device on the basis of reference color correcting parameters of a reference color image device, to program making the computer execute the processes of:

calculating reference target colors after color correction from input colors and their color correcting parametemof the reference color image device;

calculating reference color perception values and reference target color perception values related to the input colors and the reference target colors of the reference color image device;

calculating a reference corresponding color of the reference color image device that corresponds to the input colors of the object color image device;

calculating a corresponding color perception value of the reference corresponding color;

searching for a specific color that has a minimum color difference with the reference corresponding color, from the input colors of the reference color image device;

setting a specific one of the reference target colors that corresponds to the specific color, as a corresponding target color corresponding to the reference corresponding color;

calculating object target colors of the object color image device by converting the corresponding target color into a device dependent color; and calculating the object color correcting parameters from to object target colors and the input colors of the object color image device.

13. A program for use in executing, by a computer, a method of calculating object color correcting parameters of an object color image device on the basis of reference color correcting parameters of a reference color image device, the program making the, computer execute to processes of:
  calculating reference target colors afier color correction from input colors and their color correcting parameters of the, reference color image device;
  calculating reference color perception values and reference target color perception values related to the input colors and the reference target colors of the reference color image device;
  calculating a reference corresponding color of the reference color image device that corresponds to the input colors of the object color image device;
  calculating a corresponding color perception value of the reference corresponding color;
  searching for a specific color that has a minimum color difference with the reference corresponding color, from the input colors of the reference color image device;
  setting a specific one of the reference target colors that corresponds to the specific color, as a corresponding target color corresponding to the reference corresponding color;
  calculating object target colors of the object color image device by converting the corresponding target color into a device dependent color; and
  calculating the object color correcting parameters from the object target colors and the input colors of the object color image device.

14. A program for use in executing, by a computer, a method of calculating object color correcting parameters of an object color image device on the basis of reference color correcting parameters of a reference color image device, the program making the computer execute the processes of:
  calculating reference target colors after color correction from input colors and their color correcting parameters of the reference color image device;
  calculating object corresponding colors of the object color image device from the input colors of the reference color image device and the reference target colors;
  calculating object color perception values of the object corresponding colors of the object color image device;
  calculating object input color perception values from the input colors of the object color image device;
  searching for a specific color that has a minimum color difference with the input colors of the object color image device, from the object corresponding colors;
  setting a specific one of the object corresponding colors that corresponds to a specific one of the reference target colors corresponding to the specific color, as a corresponding object target color corresponding to the input colors of the object color image device;
  calculating object target colors of the object color image device by calculating a device dependent color from the specific one of the object corresponding colors; and
  calculating the object color correcting parameters of the reference color image device on the basis of the object target colors and the input colors of the object color image device.

15. A program for use in executing, by a computer, a method of calculating object color correcting parameters of an object color image device on the basis of reference color correcting parameters of a reference color image device, the program making the computer execute the processes of:
  calculating reference target colors after color correction from input colors and their color correcting parameters of the reference color image device;
  calculating object target colors on the basis of the input colors and the reference target colors;
  selecting an optimum one of the object target colors from the reference and the object target colors; and
  calculating the object color correcting parameters from the optimum one of the object target colors.

16. A color management system for usc in calculating color correcting parameters of a color image device, comprising a unit which calculates the color correcting parameters for said color image device based on both color correcting parameters of a reference color image device and information related to differences in characteristics between said color image device and said reference color image device to reproduce a same color on said color image device as said reference color image device where said reference color image device and said color image device have different color characteristics from each other, whereby said color image device corrects an input image using said color correcting parameters for the color image device.

17. A color correcting method that corrects an image input into an object color image device, wherein said correction is based on color correcting parameters calculated for the object color image device on a basis of both the color correcting parameters for the reference color image device and information related to differences between said reference color image device and said object color image device to reproduce a same color on said color image device as said reference color image device where said reference color image device and said color image device have different color characteristics from each other, whereby the image is corrected by the object color image device using the color correcting parameters for the color image device.

18. A color correcting method that corrects an image for an object color image device, wherein said correction is based on color correcting parameters that are obtained from both color correcting parameters related to a reference color image and color correcting parameters related to differences between said reference color image device and said object color image device to reproduce a same color on said color image device as said reference color image device where said reference color image device and said color image device have different color characteristics from each other, whereby the image is corrected by the object color image device using the color correcting parameters the color image device.

19. A color image device for correcting an input image and outputting a corrected image; comprising:
  a first color correcting means for correcting the input image based on color reference correcting parameters related to a reference color image device and outputting a modified image; and
  a second color correcting means for correcting said modified image based on color reference correcting parameters related to differences between said reference color image device and said color image device.

20. A color image device for correcting an input image and outputting a corrected image; comprising:
  a first color correcting means for correcting the input image based on color reference correcting parameters related to differences between said reference color image device and said color image device and outputting a modified image; and
  a second color correcting means for correcting said modified image based on color reference correcting parameters related to the reference color image device.

21. A color management device for correcting an input image and outputting a corrected image; wherein said image is corrected by a color image device based on color correcting parameters that are obtained by said color image device and color correcting parameters related to difference between a reference color image device and said color image device to reproduce a same color on said color image device as said reference color image device where said reference color image device and said color image device have different color characteristics from each other.

22. A color correcting method of correcting an input image to output a corrected image in a color image device; comprising the steps of:
  correcting the input image based on color correcting parameters related to a reference color image device and outputting a modified image and
  correcting said modified image based on color reference correcting parameters related to differences between said reference color image device and said color image device.

23. A color correcting method of correcting an input image to output a corrected image in a color image device; comprising the steps of:
  correcting the input image based on color reference correcting parameters related to differences between a reference color image device and said color image device and outputting a modified image; and
  correcting said modified image based on color reference correcting parameters related to said reference color image device.

* * * * *